(12) United States Patent
Jaeger et al.

(10) Patent No.: US 12,299,544 B2
(45) Date of Patent: May 13, 2025

(54) RUNTIME ESTIMATION FOR MACHINE LEARNING DATA PROCESSING PIPELINE

(71) Applicant: SAP SE, Walldorf (DE)

(72) Inventors: Steven Jaeger, Heidelberg (DE); Isil Pekel, Mannheim (DE); Manuel Zeise, Karlsruhe (DE)

(73) Assignee: SAP SE, Walldorf (DE)

( * ) Notice: Subject to any disclaimer, the term of this patent is extended or adjusted under 35 U.S.C. 154(b) by 440 days.

(21) Appl. No.: 17/031,661

(22) Filed: Sep. 24, 2020

(65) Prior Publication Data

US 2022/0092470 A1 Mar. 24, 2022

(51) Int. Cl.
| | | |
|---|---|---|
| *G06N 20/00* | (2019.01) | |
| *G06N 3/08* | (2023.01) | |
| *G06N 3/0985* | (2023.01) | |
| *G06N 20/20* | (2019.01) | |

(52) U.S. Cl.
CPC ............. *G06N 20/00* (2019.01); *G06N 3/08* (2013.01); *G06N 3/0985* (2023.01); *G06N 20/20* (2019.01)

(58) Field of Classification Search
CPC .......... G06N 20/00; G06N 3/08; G06N 20/20; G06N 3/0985; G06F 9/3867
See application file for complete search history.

(56) References Cited

U.S. PATENT DOCUMENTS

| | | | | |
|---|---|---|---|---|
| 10,262,271 B1* | 4/2019 | Doddi | ...................... | G06N 20/00 |
| 11,182,691 B1* | 11/2021 | Zhang | ...................... | G06N 20/00 |
| 2016/0071023 A1* | 3/2016 | Eicher | ..................... | G06N 5/025 |
| | | | | 706/12 |
| 2019/0122078 A1* | 4/2019 | Ura | .......................... | G06N 20/20 |
| 2019/0258964 A1* | 8/2019 | Dube | ......................... | G06F 16/22 |
| 2020/0012900 A1* | 1/2020 | Walters | ................ | G06N 3/0445 |
| 2020/0074347 A1* | 3/2020 | Sankaran | .................. | G06N 3/08 |
| 2020/0175354 A1* | 6/2020 | Volodarskiy | ............. | G06N 3/08 |
| 2020/0327412 A1* | 10/2020 | McCourt | ................ | G06N 20/20 |
| 2020/0327448 A1* | 10/2020 | Yakovlev | ............... | G06N 20/00 |

(Continued)

OTHER PUBLICATIONS

Doan, T. et al., "Predicting run time of classification algorithms using meta-learning," International Journal of Machine Learning and Cybernetics, Springer Berlin-Heidelberg, Vo. 8, No. 6, Jul. 27, 2016, pp. 1929-1943.

(Continued)

*Primary Examiner* — Roberto Borja
(74) *Attorney, Agent, or Firm* — Mintz Levin Cohn Ferris Glovsky and Popeo, P.C.

(57) ABSTRACT

Inputs may be received for constructing a data processing pipeline configured to implement a process to generate a machine learning model for performing a task associated with an input dataset. The process may include a plurality of machine learning trials, each of which applying, to a training dataset and/or a validation dataset generated based on the input dataset, a different type of machine learning model and/or a different set of trial parameters. The machine learning model being generated based on a result of the plurality of machine learning trials. A runtime estimate for the process to generate the machine learning model may be determined. The runtime estimate may enable the allocation of a sufficient time budget for the process. Moreover, the process may be executed if the runtime of the process does not exceed the available time budget.

16 Claims, 15 Drawing Sheets

(56) References Cited

U.S. PATENT DOCUMENTS

2021/0357256 A1* 11/2021 Cao ................... G06K 9/6267
2021/0390495 A1* 12/2021 Upadhyay ........ G06Q 10/06316

OTHER PUBLICATIONS

Dyrmishi, S. et al., "A Decision Support Framwork for AutoML Systems: A Meta-Learning Approach," 2019 International Conferece on Data Mining Workshops (ICDMW), IEEE, Nov. 8, 2019, pp. 97-106.

Ono, J. P. et al., "PipelineProfiler: A Visual analytics Tool for the Exploration of AutoML Pipelines," arXiv:2005.00160v1, May 1, 2020, (11 pages).

Reif, M. et al., "Prediction of Classifier Training Time Including Parameter Optimization," Oct. 4, 2011, Advances in Biometrics, International Conference, ICB 2207, Seoul, Korea, Aug. 27-29, 2007, Proceedings [Lecture Notes in Computer Science], Springer Berlin-Heidelberg, pp. 260-271.

Yang, C. et al., "OBOE: Collective Filtering for AutoML Model Delection," CCS '18, Proceedings of the 2018 ACM Sigsac Conference on Computer and Communications Security, ACM Press, New York, NY, Jul. 25, 2019, pp. 1173-1183.

Extended European Search Report for EP Application No. 21190951. 0-1203, mailed Feb. 18, 2022, (12 pages).

* cited by examiner

RUNTIME ESTIMATION FOR MACHINE LEARNING DATA PROCESSING PIPELINE

TECHNICAL FIELD

The subject matter described herein relates generally to machine learning and more specifically to runtime estimation for a data processing pipeline implementing a machine learning model.

BACKGROUND

Machine learning models may be trained to perform a variety of cognitive tasks including, for example, object identification, natural language processing, information retrieval, speech recognition, classification, regression, and/or the like. For example, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include a textual description of the error associated with the ticket. As such, in order to determine a suitable response for addressing the error associated with the ticket, the enterprise resource planning system may include a machine learning model trained to perform text classification. For instance, the machine learning model may be trained to determine, based at least on the textual description of the error, a priority for the ticket corresponding to a severity of the error.

SUMMARY

Systems, methods, and articles of manufacture, including computer program products, are provided for estimating a runtime of a data processing pipeline implementing a machine learning model. In one aspect, there is provided a system including at least one data processor and at least one memory. The at least one memory may store instructions that cause operations when executed by the at least one data processor. The operations may include: receiving, from a client device, one or more inputs for constructing a data processing pipeline configured to implement a process to generate a machine learning model for performing a task associated with an input dataset, the process including a plurality of machine learning trials, each of the plurality of machine learning trials applying, to a training dataset, a different type of machine learning model and/or a different set of trial parameters, and the machine learning model being generated based at least on a result of the plurality of machine learning trials; determining a first runtime for the process to generate the machine learning model; and executing, based at least on the first runtime not exceeding an available time budget, the process to generate the machine learning model.

In some variations, one or more features disclosed herein including the following features can optionally be included in any feasible combination. The first runtime may include a non-computation time associated with provisioning a computing instance and starting an execution of the plurality of machine learning trials. The non-computation time may be determined by at least applying a linear regression model configured to determine, based at least on a size of the training dataset and/or the validation dataset, the non-computation time.

In some variations, the first runtime may include a computation time associated with training a machine learning model, evaluating a performance of the machine learning model, and outputting a trained machine learning model. The computation time may be computed by applying a computation time model configured to provide a probability distribution of runtime across different trial parameter sets.

In some variations, the computation time model may include the machine learning model generated by executing the data processing pipeline, a mixture model, a neural network, an isotonic regression model, an instance-based model, a regularization model, a decision tree, a random forest, a Bayesian model, a clustering model, an associative model, a dimensionality reduction model, and/or an ensemble model.

In some variations, the computation time model may be trained based at least on timing information collected from one or more test trials and/or user trials.

In some variations, the training of the computation time model may prioritize more recent timing information and/or timing information from user trials.

In some variations, the timing information may be collected at one or more checkpoints. The timing information may include a quantity of time elapsed between two or more successive checkpoints.

In some variations, the first runtime may be determined based at least on an expected quantity of machine learning trials required to generate the machine learning model.

In some variations, the expected quantity of machine learning trials may be determined a quantity of machine learning trials executed to generate a machine learning model for one or more benchmark datasets. The one or more benchmark datasets may cover different use cases and input datasets having different characteristics.

In some variations, the first runtime may be generated based at least on a quantity of the plurality of machine learning models being executed in parallel.

In some variations, a user interface at the client device may be updated to display the first runtime. An indication to allocate a time budget corresponding to the first runtime may be received from the client device.

In some variations, a second runtime for a first machine learning trial included in the plurality of machine learning trials may be determined based at least on a first trial parameter set associated with the first machine learning trial. A third runtime for a second machine learning trial included in the plurality of machine learning trials may be determined based at least on a second trial parameter set associated with the second machine learning trial. The first machine learning trial but not the second machine learning trial may be executed based at least on the second runtime not exceeding the available time budget and the third runtime exceeding the available time budget.

In some variations, the first trial parameter set and the second trial parameter set may be generated by sampling from a uniform distribution and/or applying an information-based optimization technique.

In some variations, the executing of the first machine learning trial may include applying, to the training dataset and the validation dataset, a first machine learning model having a first set of trial parameters.

In some variations, a third machine learning trial may be executed by at least applying, to the training dataset and the validation dataset, the first machine learning model having a second set of trial parameters, a second machine learning model having the first set of trial parameters, or the second machine learning model having a third set of trial parameters.

In some variations, the data processing pipeline may include an orchestrator node, a preparator node, and an executor node. The preparator node may be configured to generate, based at least on the input dataset, a training dataset for training a machine learning model to perform the task and a validation dataset for evaluating a performance of the machine learning model trained to perform the task. The executor node may be configured to execute the plurality of machine learning trials. The orchestrator node may be configured to identify, based at least on the result of the plurality machine learning trials, the machine learning model for performing the task associated with the input dataset.

In some variations, the machine learning model for performing the task may be generated by at least executing, based on a corresponding graphical representation of the data processing pipeline, the data processing pipeline including the orchestrator node, the preparator node, and the executor node.

In some variations, the machine learning model may include a neural network, a regression model, an instance-based model, a regularization model, a decision tree, a random forest, a Bayesian model, a clustering model, an associative model, a dimensionality reduction model, and/or an ensemble model.

In another aspect, there is provided a method for estimating a runtime of a data processing pipeline implementing a machine learning model. The method may include: receiving, from a client device, one or more inputs for constructing a data processing pipeline configured to implement a process to generate a machine learning model for performing a task associated with an input dataset, the process including a plurality of machine learning trials, each of the plurality of machine learning trials applying, to a training dataset, a different type of machine learning model and/or a different set of trial parameters, and the machine learning model being generated based at least on a result of the plurality of machine learning trials; determining a first runtime for the process to generate the machine learning model; and executing, based at least on the first runtime not exceeding an available time budget, the process to generate the machine learning model.

In another aspect, there is provided a computer program product that includes a non-transitory computer readable storage medium. The non-transitory computer-readable storage medium may include program code that causes operations when executed by at least one data processor. The operations may include: receiving, from a client device, one or more inputs for constructing a data processing pipeline configured to implement a process to generate a machine learning model for performing a task associated with an input dataset, the process including a plurality of machine learning trials, each of the plurality of machine learning trials applying, to a training dataset, a different type of machine learning model and/or a different set of trial parameters, and the machine learning model being generated based at least on a result of the plurality of machine learning trials; determining a first runtime for the process to generate the machine learning model; and executing, based at least on the first runtime not exceeding an available time budget, the process to generate the machine learning model.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a machine learning data processing pipeline, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
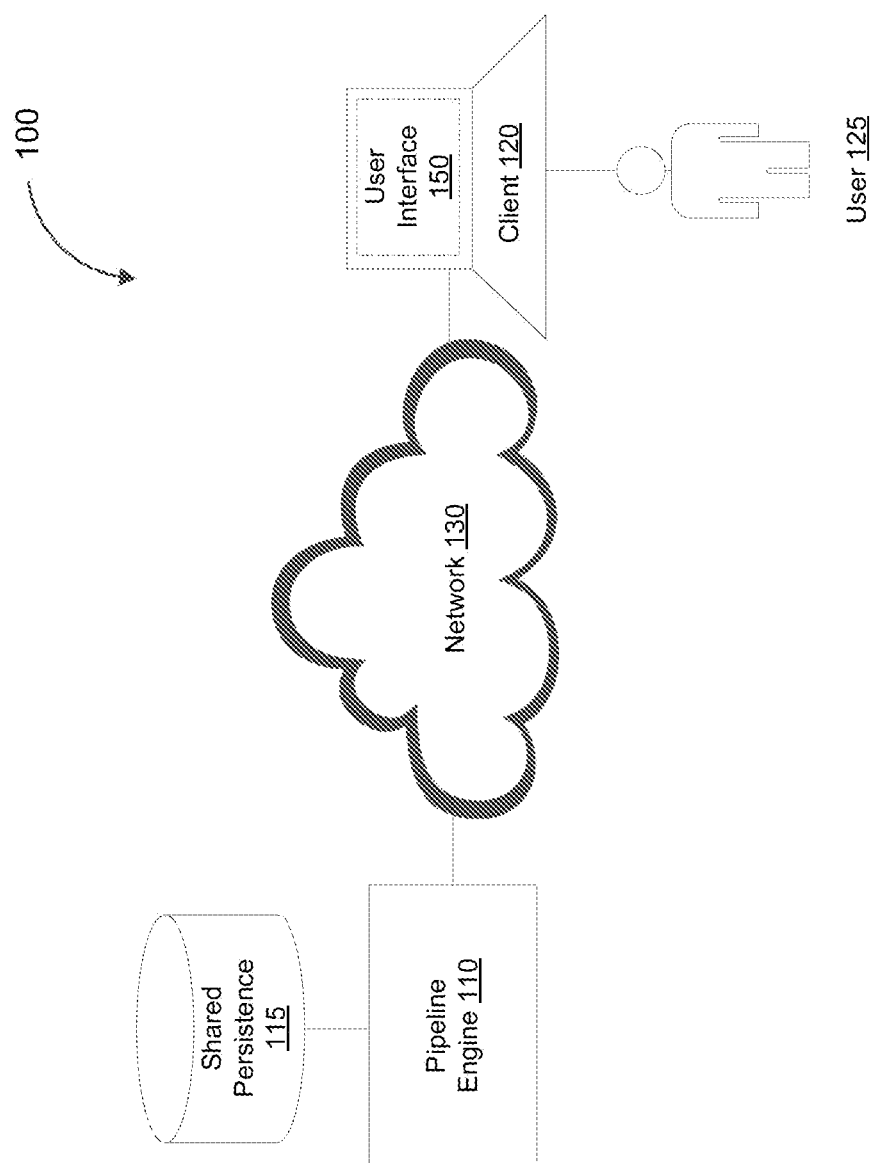
FIG. 1 depicts a system diagram illustrating a data processing pipeline generator system, in accordance with some example embodiments.

A data processing pipeline may include a series of operations for processing data including collecting and/or manipulating data, such as exceptionally voluminous and/or complex data sets known as "big data." The data processing pipeline may be represented graphically as a plurality of operator nodes interconnected by one or more directed edges of a directed graph. Each operator node may correspond to a data processing operation performed on data traversing through the operator node. Meanwhile, a directed edge interconnecting two operator nodes may indicate a flow of data between the data processing operations corresponding to each operator node. Accordingly, a graph, such as a directed graph, representative of the data processing pipeline may be constructed by at least interconnecting, with one or more directed edges, a series of operator nodes.

The graph representative of the data processing pipeline may be constructed to include one or more operator nodes configured to generate a machine learning model trained to perform a task. For example, the graph may be constructed to include an orchestrator node, one or more preparator nodes, and one or more executor nodes. The orchestrator node may be configured to coordinate the operations of preparator node and the one or more executor node. For instance, each preparator node may be configured to generate, based at least on an input dataset associated with the task, a training dataset and a validation dataset. Meanwhile, each executor node may be configured to apply, to the training dataset and the validation dataset generated by the preparator node, a different type of machine learning model and/or a different set of parameters. The orchestrator node may be configured to determine, based at least on the performance of the different type of machine learning models and/or the different sets of parameters, a machine learning model including a set of model parameters and hyper-parameters for performing the task associated with the input dataset. Accordingly, the machine learning model trained to perform the task may be generated by at least executing the data processing pipeline including the orchestrator node, the one or more preparator nodes, and the one or more executor nodes.

The data processing pipeline implementing the machine learning model may be deployed at different cloud computing platforms, each of which having a different timing definition. For example, factors affecting the runtime of the data processing pipeline, including storage capacities, technical restrictions, response times, and/or the like, may vary across different cloud computing platforms. Even at the same cloud computing platform, these factors may evolve over time due to changes in individual user provisions including, for example, types of storage, data centers, and/or the like. Variations in the timing definition of different cloud computing platforms may give rise to discrepancies in the runtime estimate of the data processing pipeline. However, an accurate and consistent runtime estimate may be necessary for establishing a reliable and efficient time budget. For instance, an accurate and consistent runtime estimate may enable the allocation of a sufficient time budget for executing a quantity of machine learning trials required to determine a machine learning model including a set of model parameters and hyper-parameters for performing a task. Alternatively and/or additionally, an accurate and consistent runtime estimate may be required to determine whether one or more machine learning trials may be executed without exceeding the remaining time budget.

In some example embodiments, a runtime estimator may be configured to determine, for the data processing pipeline, a runtime estimate for executing one or more machine learning trials, each of which including a different type of machine learning model and/or a different set of trial parameters. For example, the runtime estimator may define checkpoints for collecting time information in order to avoid inconsistencies introduced by different timing definitions at different cloud computing platforms. Moreover, the runtime estimator may be further configured to generate, based at least on the runtime estimate, a time budget estimate for a process in which one or more machine learning trials are executed to generate a machine learning model including a set of model parameters and hyper-parameters for performing a task. Alternatively and/or additionally, the runtime estimator may identify, based at least on the runtime estimate of various machine learning trials included in the process, one or more machine learning trials that may be executed without exceeding the available time budget.

FIG. 1 depicts a system diagram illustrating a data processing pipeline generator system 100, in accordance with some example embodiments. Referring to FIG. 1, the data processing pipeline generator system 100 may include a pipeline engine 110. As shown in FIG. 1, the pipeline engine 110 and the client 120 may be communicatively coupled via a network 130. The client 120 may be a processor-based device including, for example, a smartphone, a tablet computer, a wearable apparatus, a virtual assistant, an Internet-of-Things (IoT) appliance, and/or the like. Meanwhile, the network 130 may be any wired and/or wireless network including, for example, a public land mobile network (PLMN), a wide area network (WAN), a local area network (LAN), a virtual local area network (VLAN), the Internet, and/or the like.

The client 120 may interact with the pipeline engine 110 to generate one or more data processing pipelines. As shown in FIG. 1, the pipeline engine 110 may be associated with a user interface 150 configured to receive, from a user 125 at the client 120, one or more inputs for editing a graph representative of a data processing pipeline as well as output, to the user 125 at the client 120, a progress and/or a result of executing the data processing pipeline. In some example embodiments, the one or more inputs may edit the graph representative of the data processing pipeline to include one or more operator nodes configured to generate, based at least on an input dataset, a machine learning model trained to perform a task associated with the input dataset. For example, the graph representative of the data processing pipeline may be edited to include an orchestrator node, one or more preparator node, and one or more executor nodes.

In some example embodiments, the orchestrator node may be configured to coordinate the operations of the one or more executor node. Meanwhile, each executor node may be configured to apply, to a training dataset and a validation dataset generated by the one or more preparator nodes based on the input dataset, a different type of machine learning model. Furthermore, the orchestrator node may be configured to identify, based at least on the performance of the different type of machine learning models, a machine learning model for performing the task associated with the input dataset. Accordingly, the machine learning model trained to perform the task may be generated by at least executing the data processing pipeline including the orchestrator node, the one or more preparator nodes, and the one or more executor nodes. For example, the data processing pipeline may be executed to generate a machine learning model trained to perform a cognitive task such as object identification, natural language processing, information retrieval, speech recognition, classification, and/or regression. The machine learning model may be any type of machine learning model including, for example, a neural network, a regression model, an instance-based model, a regularization model, a decision tree, a random forest, a Bayesian model, a clustering model, an associative model, a dimensionality reduction model, an ensemble model, and/or the like.

Figure 2A:
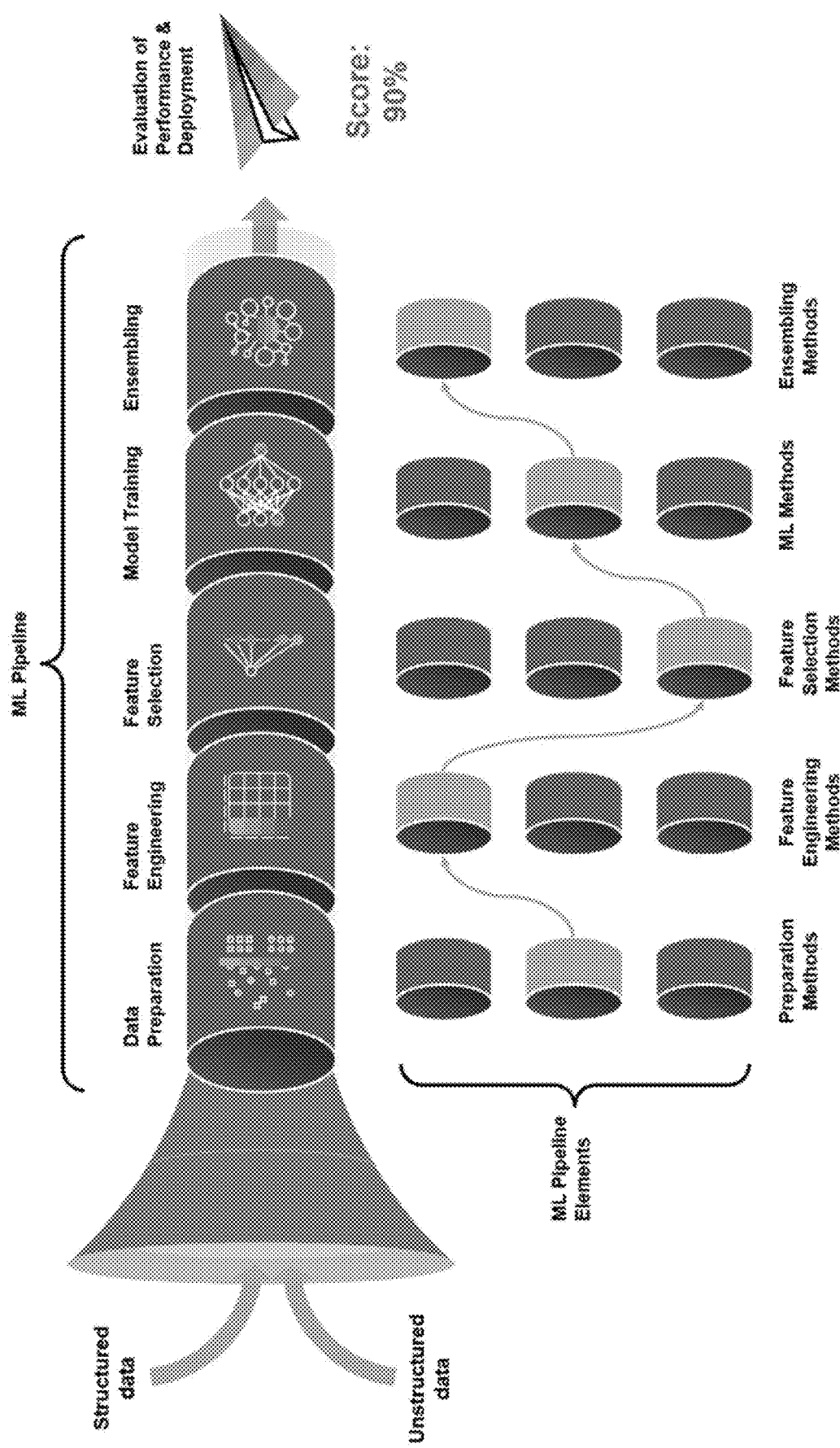
FIG. 2A depicts a schematic diagram illustrating an example of a data processing pipeline having modular pipeline elements, in accordance with some example embodiments.

To further illustrate, FIG. 2A depicts a schematic diagram illustrating an example of a data processing pipeline having modular pipeline elements, in accordance with some example embodiments. As shown in FIG. 2A, the data processing pipeline may include different combination of the elements for data preparation, feature engineering, feature selection, model training, ensembling, and/or the like. Each element of the data processing pipeline may be associated with one or more hyper-parameters. A machine learning model for performing the task associated with the input dataset may be identified by at least evaluating a performance of the data processing pipeline across different combinations of pipeline elements and hyper-parameters. For example, an executor node may be configured to execute one or more machine learning trials, each of which corresponding to a different combination of pipeline elements and hyper-parameters. Moreover, the orchestrator node may identify, based at least on the performance of the one or more machine learning trials, the machine learning model for performing the task associated with the input dataset.

Figure 2B:
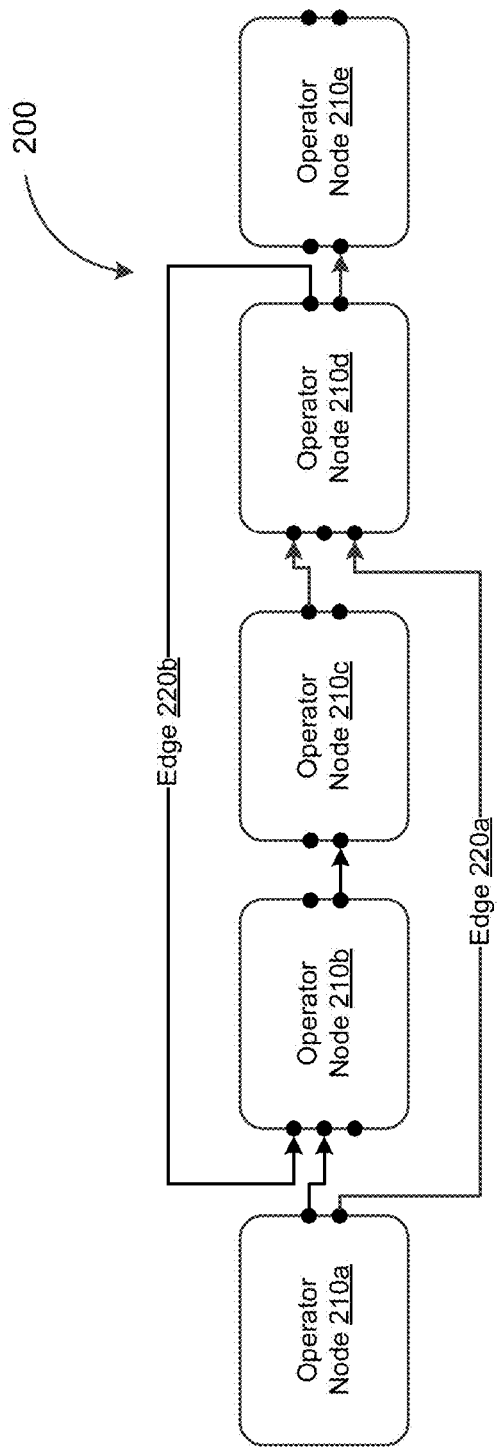
FIG. 2B depicts an example of a graph representative of a data processing pipeline, in accordance with some example embodiments.

FIG. 2B depicts an example of a graph representative of a data processing pipeline 200, in accordance with some example embodiments. Referring to FIG. 2B, the data processing pipeline 200 may include a plurality of operator nodes including, for example, a first operator node 210a, a second operator node 210b, a third operator node 210c, a fourth operator node 210d, a fifth operator node 210e, and/or the like. Each of the first operator node 210a, the second operator node 210b, the third operator node 210c, the fourth operator node 210d, and/or the fifth operator node 210e may correspond to a data processing operation performed on data traversing through the operator node.

Furthermore, FIG. 2B shows the first operator node 210a, the second operator node 210b, the third operator node 210c, the fourth operator node 210d, and/or the fifth operator node 210e as interconnected via one or more directed edges. A directed edge may indicate a flow of data between the data processing operations corresponding to operator nodes interconnected by the directed edge. For example, a first edge 220a may interconnect the first operator node 210a and the fourth operator node 210d to at least indicate that an output of the data processing operation corresponding to the first operator node 210a is provided as an input to the data processing operation corresponding to the fourth operator node 210d. Alternatively and/or additionally, a second edge 220b interconnected the second operator node 210b and the fourth operator node 210d may indicate that an output of the data processing operation corresponding to the fourth operator node 210d may be provided as an input to the data processing operation corresponding to the second operator node 210b.

Figure 2C:
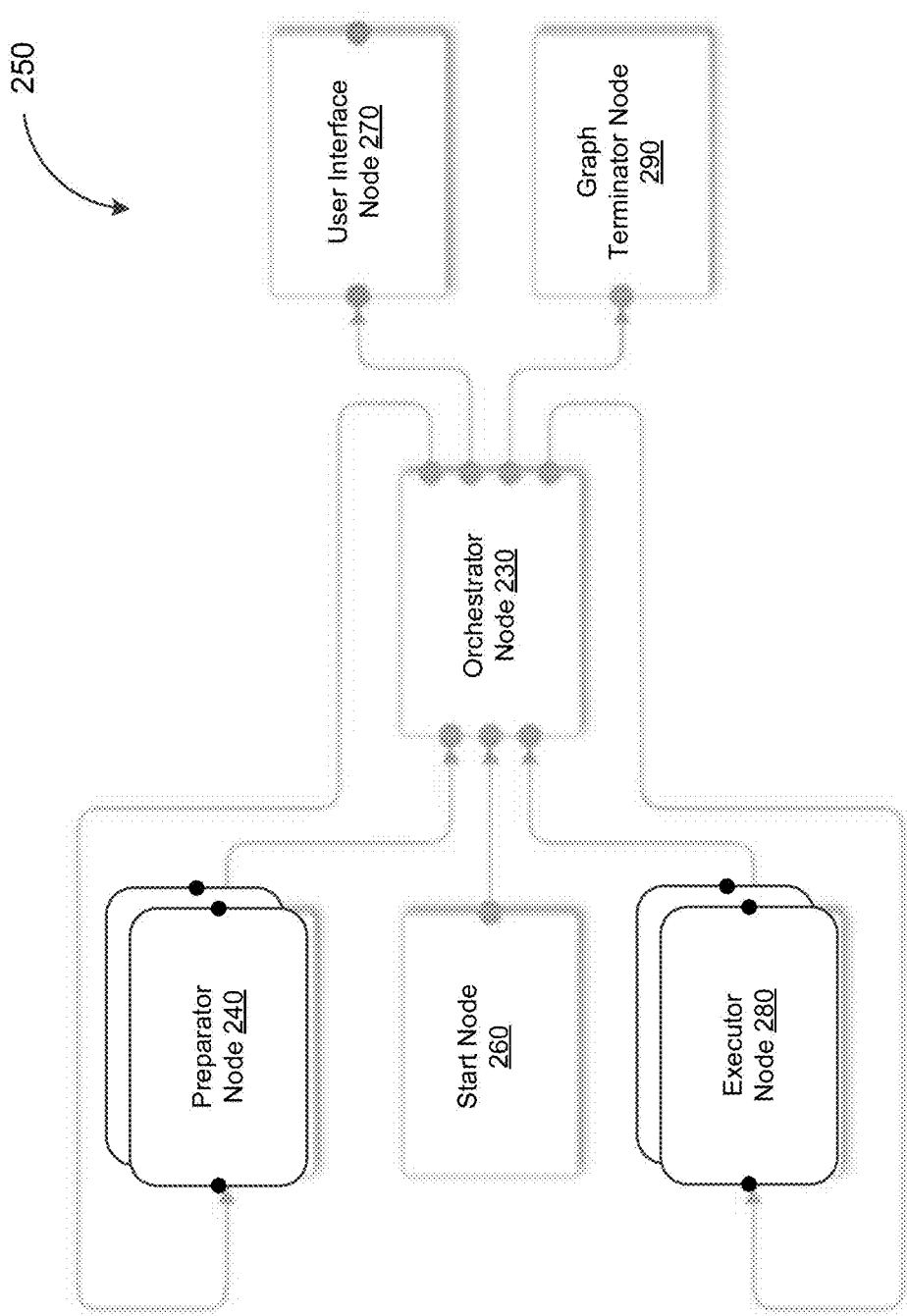
FIG. 2C depicts examples of operator nodes forming a data processing pipeline configured to generate a machine learning model, in accordance with some example embodiments.

In some example embodiments, a data processing pipeline may be constructed to include one or more specific operator nodes in order to implement a machine learning model trained to perform a cognitive task such as, for example, object identification, natural language processing, information retrieval, speech recognition, classification, and/or regression. FIG. 2C depicts examples of operator nodes forming a data processing pipeline 250 configured to generate a machine learning model, in accordance with some example embodiments. As shown in FIG. 2C, the data processing pipeline 250 may be constructed to include an orchestrator node 230 and one more preparator nodes such as, for example, a preparator node 240. Furthermore, the data processing pipeline 250 may be constructed to include one or more executor nodes including, for example, an executor node 280. Alternatively and/or additionally, the data processing pipeline 250 may be constructed to include one or more auxiliary operator nodes including, for example, a start node 260, a user interface node 270, and a graph terminator node 290. The start node 260 may receive an initial configuration to generate a machine learning model as specified, for example, by the user 125 at the client 120. Meanwhile, the user interface node 270 may be configured to generate and/or update the user interface 150 to display, at the client 120, a progress of executing the data processing pipeline 200. The graph terminator node 290 may be invoked to terminate the execution of the data processing pipeline 250. It should be appreciated that the data processing pipeline 250 may implement a process in which one or more machine learning trials are executed to generate a machine learning model for performing task.

In some example embodiments, the preparator node 240 may be configured to validate and preprocess an input dataset received, for example, from the client 120. Furthermore, the preparator node 240 may be configured to generate, based at least on the input dataset, a training dataset and a validation dataset. For example, the input dataset may include text associated with one or more errors reported to an issue tracking system. The preparator node 240 may validate the input dataset and terminate additional processing of the input dataset in response to identifying one or more errors present in the input dataset. Upon validating the input dataset, the preparator node 240 may preprocess the input dataset including by removing invalid rows and/or columns of data from the input dataset as well as encoding any text included in the input dataset. The preparator node 240 may partition the validated and preprocessed input dataset into a training dataset for training a machine learning model to perform text classification and a validation dataset for evaluating a performance of the trained machine learning model performing text classification.

In some example embodiments, the executor node 280 may be configured to execute, based on the training dataset and/or the validation dataset generated by the preparator node 240, one or more machine learning trials. Each machine learning trial may include applying, to the training dataset and/or the validation dataset, a machine learning model having a specific set of trial parameters. The set of trial parameters may include one or more parameters of the machine learning model such as, for example, the initial weights applied by the machine learning model prior to training. Furthermore, the set of trial parameters may include one or more hyper-parameters of the machine learning model including, for example, the learning rate (e.g. step size) of a neural network, the value of the constant k in a k-nearest neighbors clustering algorithm, the cost and sigma associated with a support vector machine, and/or the like.

The executor node 280 may be configured to execute a sequence of machine learning trials, each of which including a different type of machine learning model and/or a different set of trial parameters. For instance, the executor node 280 may execute a first machine learning trial by at least applying, to the training dataset and/or the validation dataset, a first machine learning model having a first set of trial parameters. The executor node 280 may also execute a second machine learning trial by at least applying, to the training dataset and/or the validation dataset, the first machine learning model having a second set of trial parameters or a second machine learning model having a third set of trial parameters. As used herein, a "process" may refer to a test process or sequence that includes one or more machine learning trials. The process may be executed by the executor node 280 to generate a machine learning model including a set of model parameters and hyper-parameters for performing a task.

In some example embodiments, the orchestrator node 230 may be configured to coordinate the operations of the preparator node 240 and the executor node 280. The orchestrator node 230 may respond to receiving, from the start node 260, the initial configurations for implementing the machine learning model by at least triggering, at the preparator node 240, the generation of the training dataset and the validation dataset. The initial configuration may include, for example, a type of task (e.g., classification, regression, and/or the like), a target column (e.g., column in the training dataset corresponding to a ground-truth label), a target metric (e.g., accuracy), column names and/or types in the training dataset and the validation dataset, a computational resource budget (e.g., maximum execution time and/or the like), a path to an output directory, a path to the training dataset, a path to a validation dataset, and/or the like.

Upon receiving, from the preparator node 240, an indication that the preparator node 240 has generated the training dataset and the validation dataset, the orchestrator node 230 may determine a machine learning model including a set of model parameters and hyper-parameters for performing the task associated with the input dataset (e.g., classify text associated with an issue tracking system and/or the like). For example, the orchestrator node 230 may determine a machine learning model including a set of model parameters and hyper-parameters for performing the task associated with the input dataset by at least triggering, at the executor node 280, the execution of one or more machine learning trials, each of which including a different type of machine learning model and/or a different set of trial parameters. The orchestrator node 230 may trigger, at the executor node 280, a quantity of machine learning trials that is consistent with the computational resource budget set forth in the initial configurations for implementing the machine learning model. For instance, the orchestrator node 230 may trigger an additional machine learning trial based at least on a quantity of remaining computational resource being sufficient to support the execution of the additional machine learning trial.

In some example embodiments, the trial parameter set used for a machine learning trial may be selected randomly from a hyper-parameter space that includes parameters governing the configuration of the data processing pipeline 250 as well as the configuration of each node within the data processing pipeline 250. A machine learning model including a set of model parameters and hyper-parameters for performing the task associated with the input dataset may be identified by applying an information-based optimization technique (e.g., Bayesian optimization and/or the like), which may start with a random set of trial parameters before incorporating the corresponding result to identify regions in the hyper-parameter space that are most likely to include the set of model parameters and hyper-parameters associated with the machine learning model that is identified, within the available time budget, as being most suitable for the task associated with the input dataset. With each successive update, the sampling of the hyper-parameter space may shift from a uniform sampling to an information-weighted sampling using Bayesian (or other) methods.

The executor node 280 may execute the first machine learning trial including the first machine learning model having the first set of trial parameters and the second machine learning trial including the first machine learning model having the second set of trial parameters or the second machine learning model having the third set of trial parameters. Accordingly, the orchestrator node 230 may select, based at least on the respective performances of the first machine learning model having the first set of trial parameters, the first machine learning model having the second set of trial parameters, and/or the second machine learning model having the third set of trial parameters, the machine learning model including the set of model parameters and hyper-parameters for performing the task associated with the input dataset. Upon selecting the machine learning model including the set of model parameters and hyper-parameters for performing the task associated with the input dataset, the orchestrator node 230 may terminate the execution of the data processing pipeline 250 including by sending, to the graph terminator node 290, a message to terminate the execution of the data processing pipeline 250.

As noted, the executor node 280 may execute the first machine learning trial and the second machine learning trial in sequence. However, it should be appreciated that the data processing pipeline 250 may be constructed to include multiple executor nodes and that orchestrator node 230 may coordinate the operations of the multiple executor nodes executing multiple machine learning trials in parallel. Moreover, the data processing pipeline 250 may be constructed to include multiple preparator nodes and the orchestrator node 230 may coordinate the operations of multiple preparator nodes generating the input dataset and the validation dataset in parallel.

In some example embodiments, the orchestrator node 230, the preparator node 240, and the executor node 280 may communicate via one or more messages. However, these messages may exclude intermediate data such as, for example, the training dataset and the validation dataset generated by the preparator node 240. Instead, the orchestrator node 230, the preparator node 240, and the executor node 280 may exchange intermediate data via a shared persistence 115 accessible to the orchestrator node 230, the preparator node 240, and the executor node 280. For example, the orchestrator node 230 may store, in the shared persistence 115, at least a portion of the initial configurations that includes the input dataset associated with the specified task. Likewise, the preparator node 240 may store, in the shared persistence 115, the training dataset and the validation dataset generated based on the input dataset. Instead of sending the input dataset, the training dataset, and the validation dataset directly, the orchestrator node 230, the preparator node 240, and the executor node 280 may exchange the input dataset, the training dataset, and/or the validation dataset by at least sending messages indicating the availability of the input dataset, the training dataset, and/or the validation dataset in the shared persistence 115. Accordingly, the preparator node 240 may access the shared persistence 115 to retrieve the input dataset in order to generate the training dataset and the validation dataset while the executor node 280 may access the shared persistence 115 to retrieve the training dataset and the validation dataset for use during the execution of the one or more machine learning trials.

Figure 3A:
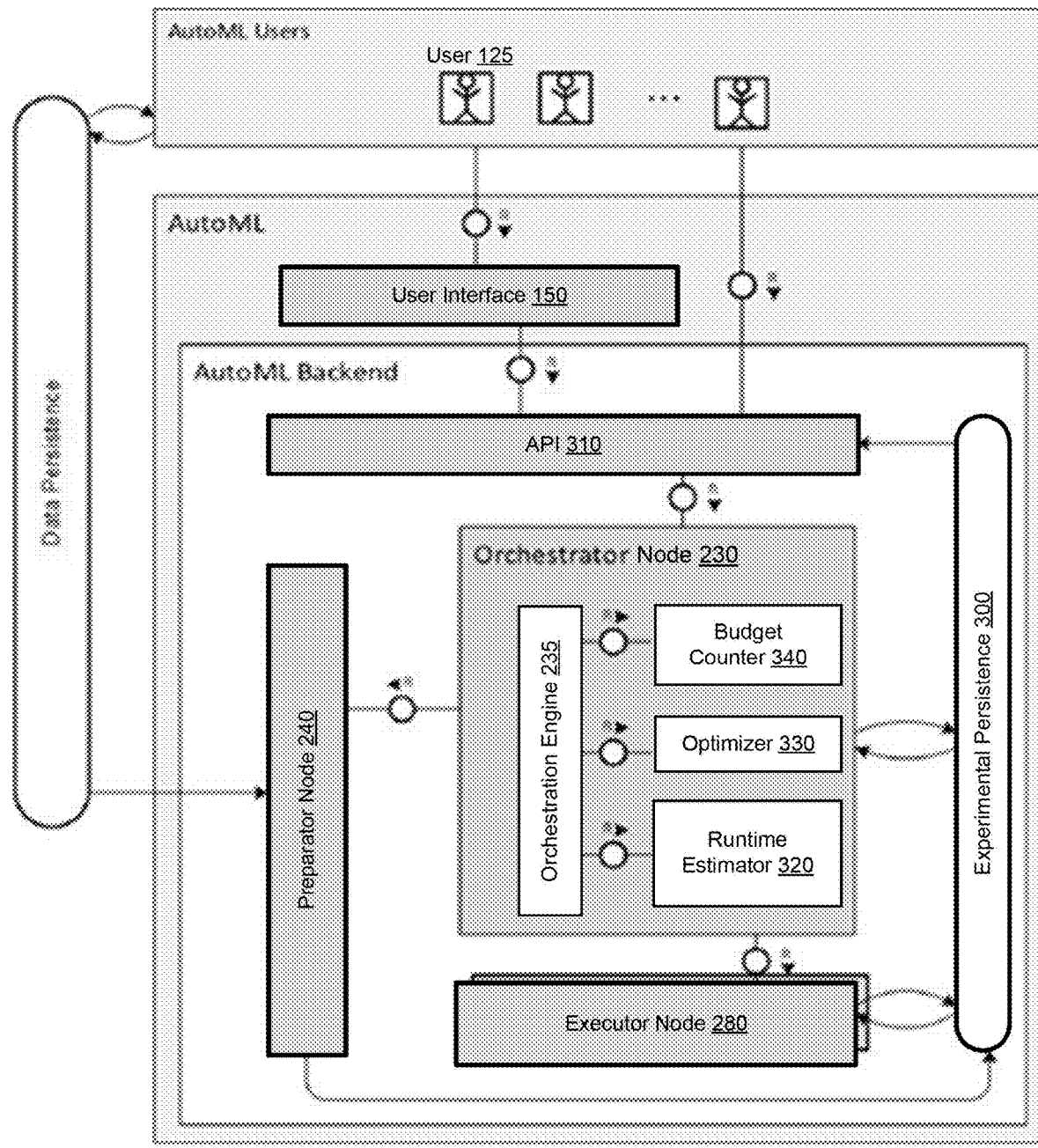
FIG. 3A depicts a block diagram illustrating an example communication flow between the operator nodes forming a data processing pipeline configured to generate a machine learning model, in accordance with some example embodiments.

FIG. 3A depicts a block diagram illustrating an example communication flow between the operator nodes forming the data processing pipeline 250 configured to generate a machine learning model, in accordance with some example embodiments. Referring to FIG. 3A, the orchestrator node 230, the preparator node 240, and the executor node 280 may exchange intermediate data by at least accessing an experimental persistence 300, which may form a part of the shared persistence 115 shown in FIG. 1. As shown in FIG. 3A, the user 125 at the client 120 may interact with the user interface 150 to specify, via an application programming interface 310, the initial configurations for the machine learning model performing a task such as, for example, object identification, natural language processing, information retrieval, speech recognition, classification, and/or regression. In response to receiving the initial configurations for the machine learning model, the orchestrator node 230 may trigger, at the preparator node 240, the generation of the training dataset to train the machine learning model to perform a specified task and the validation dataset to evaluating a performance of the trained machine learning model performing the specified task. The preparator node 240 may store, in the experimental persistence 300, the training dataset and the validation dataset. Moreover, the preparator node 240 may send, to the orchestrator node 230, the first message notifying the orchestrator node 230 of the availability of the training dataset and the validation dataset.

In response to the first message from the preparator node 240, the orchestrator node 230 may send, to the executor node 280, the second message to trigger the execution of one or more machine learning trials. For example, the executor node 280 may respond to the second message by at least executing the first machine learning trial including the first machine learning model having the first set of trial parameters and/or the second machine learning trial including the first machine learning model having the second set of trial parameters or the second machine learning model having the third set of trial parameters. The executor node 280 may further store, in the experimental persistence 300, the results of the machine learning trials corresponding, for example, to the respective performances of the first machine learning model having the first set of trial parameters, the first machine learning model having the second set of trial parameters, and/or the second machine learning model having the third set of trial parameters. In order to identify the machine learning model including the set of model parameters and hyper-parameters for performing the specified task, the orchestrator node 230 may at least access the experimental persistence 300 to evaluate the results of the machine learning trials relative, for example, to the target metric specified by the user 125 as part of the initial configurations for the machine learning model.

The data processing pipeline 250 including the orchestrator node 230, the preparator node 240, and the executor node 280 may be executed to perform feature extraction, feature pre-processing, and training of a machine learning model. For example, the feature extraction may be performed to generate numerical features based on one or more columns of data from the input dataset including by encoding categorical features and/or extracting values from the data fields in each column. The feature-preprocessing may include a normalization of values occupying one or more columns in the input dataset. Accordingly, the machine learning model may be trained by at least applying the machine learning model to the numerical columns generated by the feature extraction and/or the feature pre-processing.

In some example embodiments, the data processing pipeline 250 may be configured to adapt dynamically based on the metrics and/or configuration of the input dataset. Furthermore, the data processing pipeline 250 may adapt dynamically based on one or more previous processing operations in the data processing pipeline 250. As such, some operations may be omitted from the data processing pipeline 250 to reduce operation cost, minimize training time, and increase the accuracy of the resulting machine learning model. For example, whether the executor node 280 performs feature selection may be contingent upon the quantity of available features. That is, the executor node 250 may perform feature selection if more than a threshold quantity of features are available. The executor node 280 may also avoid subjecting embedded columns to any additional processing in order to avoid distorting the embedding space. In the event the input dataset does not include any columns with textual data, the executor node 280 may omit any text encoding, thereby reducing the hyper-parameter space. Moreover, the executor node 280 may also exclude the one or more column from the input dataset determined to have below-threshold information value such as, for example, columns with below threshold value target cross-entropy.

In some example embodiments, the quantization of a hyper-parameter may be adapted based on the metrics of the input dataset including, for example, the quantity of columns and/or the quantity of unique values across columns containing certain datatypes. As used herein, the "quantization" of hyper-parameter may refer to the discrete values that the hyper-parameter may take on during each machine learning trial. For example, if the hyper-parameter column sampling rate yields substantially the same results at 10% and at 12%, then the hyper-parameter column sampling rate may be varied at increments of 20% for each machine learning trial.

Figure 3B:
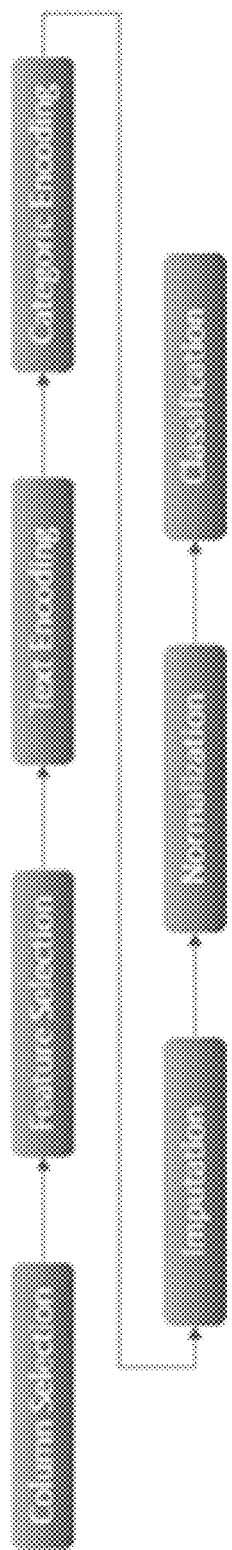
FIG. 3B depicts a flowchart illustrating examples of the data processing operations performed by an executor node forming a data processing pipeline configured to generate a machine learning model, in accordance with some example embodiments.

FIG. 3B depicts a flowchart illustrating examples of the data processing operations performed by the executor node 280 forming the data processing pipeline 250 configured to generate a machine learning model, in accordance with some example embodiments. In some example embodiments, the executor node 280 may respond to the second message from the orchestrator node 230 by at least accessing the shared persistence 115 to retrieve the training dataset and/or the validation dataset generated by the preparator node 240. The executor node 280 may perform, on the training dataset and/or the validation dataset, a sequence of data processing operations, each of which applying a different transformation on the training dataset and/or the validation dataset. As shown in FIG. 3B, the executor node 280 may perform data processing operations that include, as the example, a column selection operation, a feature selection operation, a text encoding operation, a categorical encoding operation, an imputation operation, a normalization operation, a classification operation, and/or the like.

In some example embodiments, the executor node 280 performing a single machine learning trial may generate a corresponding candidate machine learning model having a specific set of parameters and/or hyper-parameters. The executor node 280 may store, in the shared persistence 115 (e.g., the experimental persistence 300), the candidate machine learning model. Moreover, the executor node 280 may send, to the orchestrator node, the result of the machine learning trial, which may correspond to the performance of the candidate machine learning model operating on the validation dataset. For example, the executor node 280 may store, in the shared persistence 115 (e.g., the experimental persistence 300), the result of the machine learning trial such that the orchestrator node 230 may access the shared persistence 115 (e.g., the experimental persistence 300) to retrieve the result of the machine learning trial. As noted, the orchestrator node 230 may access the shared persistence 115 (e.g., the experimental persistence 300) in order to evaluate the results of one or more machine learning trials and generate a machine learning model including a set of model parameters and hyper-parameters for performing the task specified by the user 125 at the client 120.

Figure 3C:
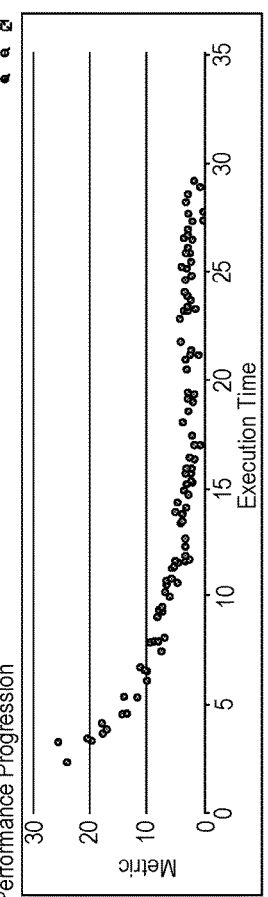
FIG. 3C depicts an example of a user interface, in accordance with some example embodiments.
Figure 3D:
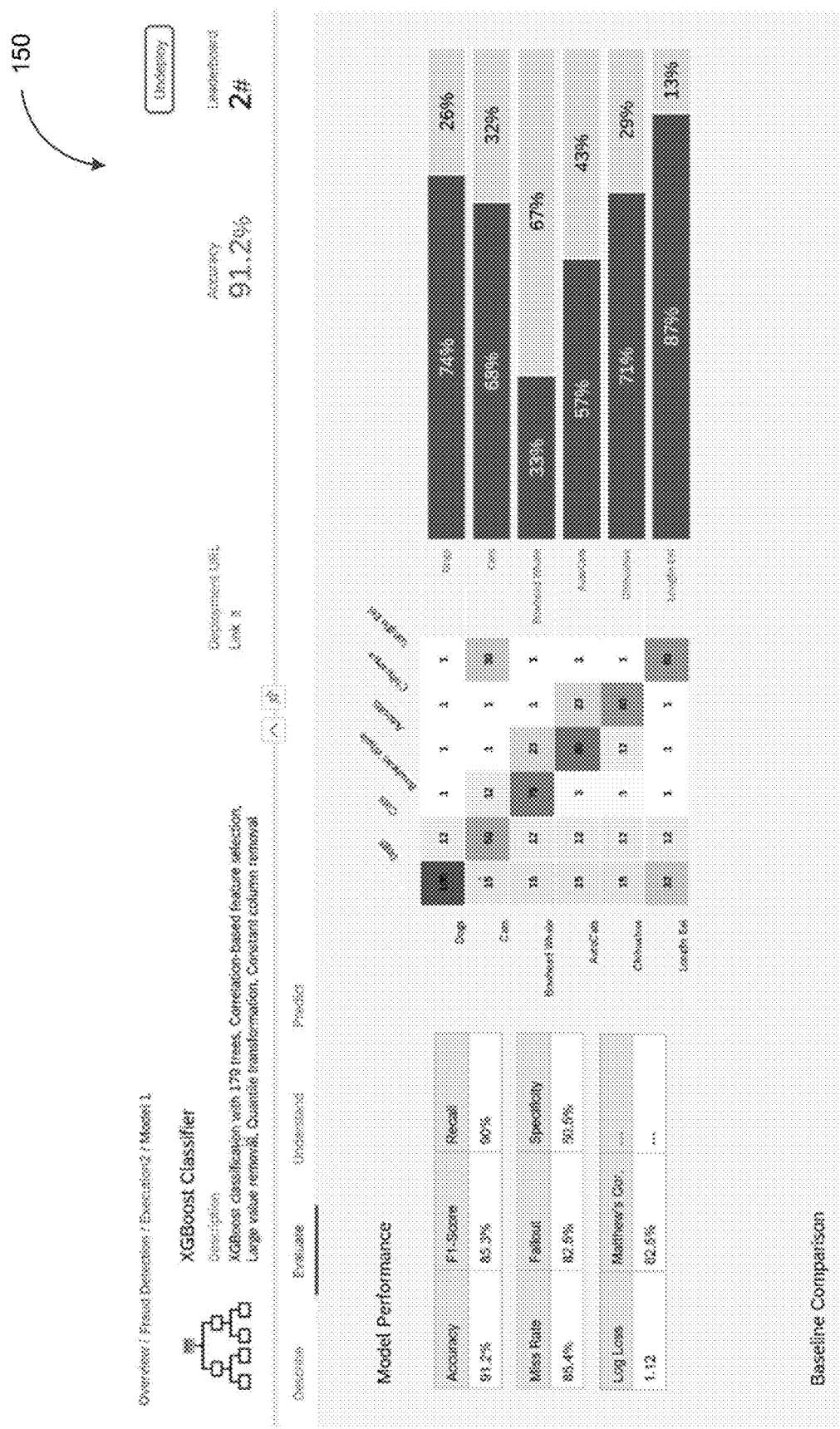
FIG. 3D depicts another example of a user interface, in accordance with some example embodiments.

FIGS. 3C-D depict examples of the user interface 150, in accordance with some example embodiments. As shown in FIGS. 3C-D, the user interface 150 may be updated to display, at the client 120, a progress as well as a result of the one or more machine learning trials. For example, the user interface 150 may be updated to display, at the client 120, a model accuracy, a calibration curve, a confusion matrix, a significance of each feature (e.g., a relevance of each column in the training dataset for a machine learning model), and/or the like. In the example of the user interface 150 shown in FIG. 3C, the progress and the results associated with multiple types of machine learning models may be sorted in order to identify the one or more machine learning model having a best result. FIG. 3D depicts an example of the user interface 150 displaying the progress and the result of a single type of machine learning model (e.g., an XGBoost Classifier).

Figure 4:
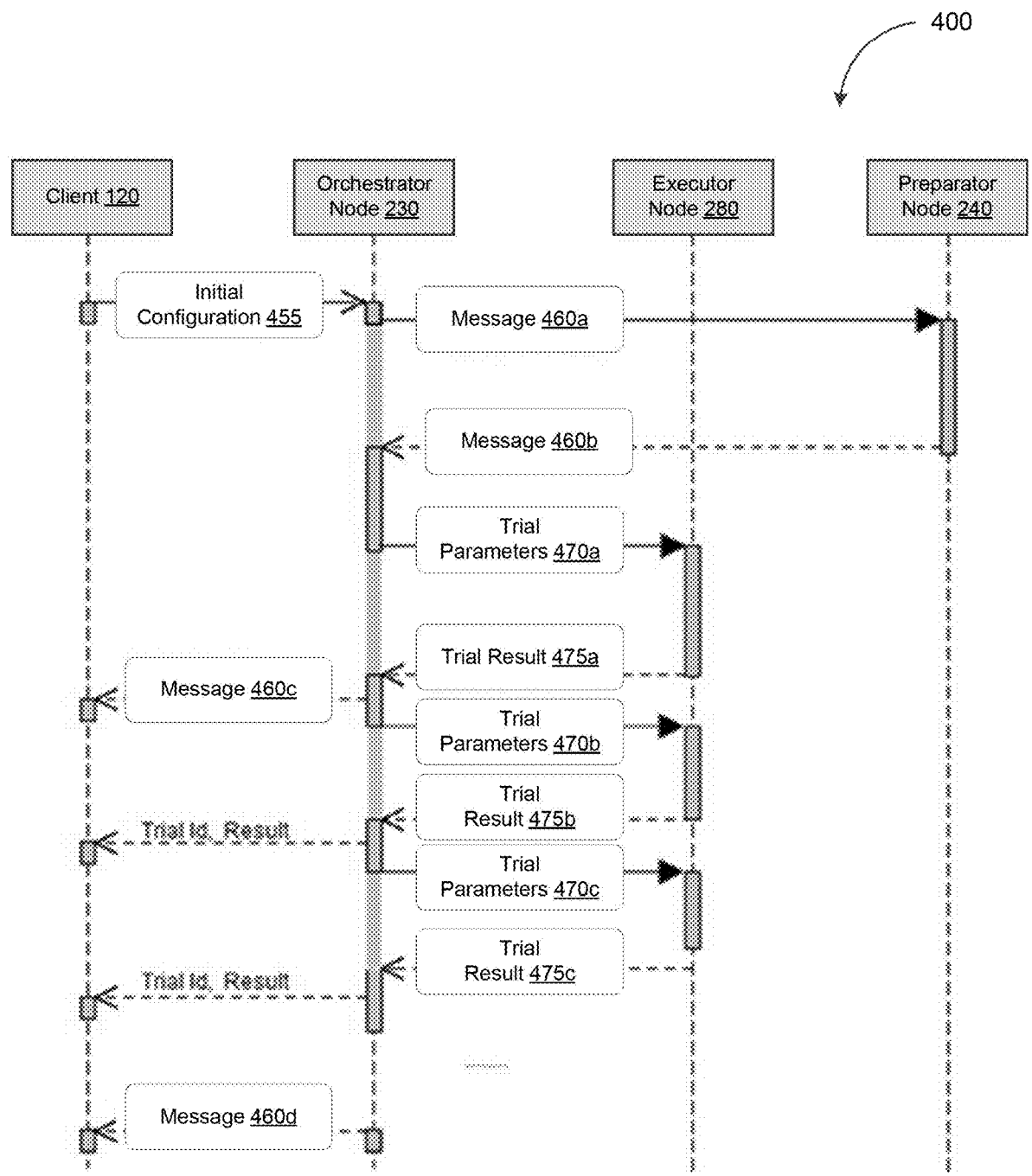
FIG. 4 depicts a sequence diagram illustrating an example of a process for generating a machine learning model trained to perform a task, in accordance with some example embodiments.

FIG. 4 depicts a sequence diagram illustrating a process 400 for generating a machine learning model trained to perform a task, in accordance with some example embodiments. Referring to FIGS. 1, 2A-C, 3A-C, and 4, the process 400 may be performed by the pipeline engine 110 as part of executing the data processing pipeline 250 to generate a machine learning model having a set of parameters and/or hyper-parameters for performing a cognitive task such as, for example, object identification, natural language processing, information retrieval, speech recognition, classification, and/or regression.

The orchestrator node 230 may receive, from the client 120, an initial configuration 455 for implementing a machine learning model to perform a cognitive task such as, for example, object identification, natural language processing, information retrieval, speech recognition, classification, and/or regression. In response to receiving the initial configuration 455 from the client 120, the orchestrator node 230 may trigger, at the preparator node 240, the generation of a training dataset for training the machine learning model to perform the task and a validation dataset for evaluating a performance of the machine learning model trained to perform the task. As shown in FIG. 4, the orchestrator node 230 may trigger the generation of the training dataset and the validation dataset by at least sending, to the preparator node 240, a first message 460a. The preparator node 240 may respond to the first message 460a by generating the training dataset and the validation dataset as well as perform one or more preparatory tasks such as the embedding and/or encoding a variety of data (e.g., textual data, numerical data, spatial data, categorical data, and/or the like). When the preparator node 240 completes generating the training dataset and the validation dataset as well as the preparatory tasks, the preparator node 240 may send, to the orchestrator node 230, a second message 460b notifying the orchestrator node 230 of the availability of the training dataset and the validation dataset as well as the results of the preparatory tasks. The preparator node 240 may store the training dataset and the validation dataset in the shared persistence 115 (e.g., the experimental persistence 300) where the training dataset and the validation dataset may be accessible to the orchestrator node 230 and the executor node 280. As such, the preparator node 240 may avoid sending the training dataset and the validation dataset directly to the orchestrator node 230 in the second message 460b.

The orchestrator node 230 may respond to the second message 460b by at least triggering, at the executor node 280, the execution of a first machine learning trial. As shown in FIG. 4, the orchestrator node 230 may trigger the execution of the first machine learning trial by at least sending, to the executor node 280, a first set of trial parameters 470a. The first set of trial parameters 470a may include one or more parameters of the machine learning model such as, for example, the initial weights applied by the machine learning model prior to training. Furthermore, the first set of trial parameters 470a may include one or more hyper-parameters of the machine learning model including, for example, the learning rate (e.g., step size) of a neural network, the value of the constant k in a k-nearest neighbors clustering algorithm, the cost and sigma associated with a support vector machine, and/or the like. The executor node 280 may execute the first machine learning trial by at least applying, to the training dataset and the validation dataset generated by the preparator node 240, a machine learning model having the first set of trial parameters 470a.

In some example embodiments, the orchestrator node 230 may continue to trigger the execution of additional machine learning trials if there are sufficient remaining computational resources, including time budget, to support the execution of additional machine learning trials. For example, FIG. 4 shows the orchestrator node 230 as sending, to the executor node 280, a second set of trial parameters 470b to trigger the execution of a second machine learning trial at the executor node 280 and a third set of trial parameters 470c to trigger the execution of a third machine learning trial at the executor node 280.

The executor node 280 may return, to the orchestrator node 230, a first trial result 475a of executing the first machine learning trial, a second trial result 475b of executing the second machine learning trial, and a third trial result 475c of executing the third machine learning trial. The first trial result 475a, the second trial result 475b, and the third trial result 475c may correspond to a performance of one or more machine learning models having the first set of trial parameters 470a, the second set of trial parameters 470b, and the third set of trial parameters 470c. Moreover, it should be appreciated that the executor node 280 may send the first trial result 475a, the second trial result 475b, and the third trial result 475c to the orchestrator node 230 by at least storing the first trial result 475a, the second trial result 475b, and the third trial result 475c in the shared persistence 115 (e.g., the experimental persistence 300).

For example, the executor node 280 may evaluate the first trial result 475a, the second trial result 475b, and/or the third trial result 475c relative to the target metric specified by the user 125 as part of the initial configurations for the machine learning model in order to identify the machine learning model having the set of parameters and/or hyper-parameters for performing the task. The executor node 280 may select, for example, the first set of trial parameters 470a and the machine learning model associated with the first set of trial parameters 470a based at least on the first trial result 475a being more optimal with respect to the target metric specified by the user 125 than the second trial result 475b and the third trial result 475c. The target metric may be an accuracy of the machine learning model, in which case the first trial result 475a may be more optimal by exhibiting a higher target metric than the second trial result 475b and the third trial result 475c. Alternatively and/or additionally, the target metric may be a log loss, in which case the first trial result 475a may be more optimal by exhibiting a lower target metric than the second trial result 475b and the third trial result 475c.

In the example shown in FIG. 4, the orchestrator node 230 may send, to the client 120, one or more messages indicating a status of the machine learning trials. For instance, the orchestrator node 230 may send, to the client 120, a third message 460c including the first trial result 475a of the first machine learning trial executed by the executor node 280. Alternatively and/or additionally, the orchestrator node 230 may send, to the client 120, a fourth message 460d including the third trial result 475c of the third machine learning trial executed by the executor node 280 as well as an indication of a completion of the machine learning trials. The orchestrator node 230 may communicate with to the client 120 via the user interface node 270, which may be configured to generate and/or update the user interface 150 to display, at the client 120, at least a portion of the content of the third message 460c and/or the fourth message 460d.

Figure 5:
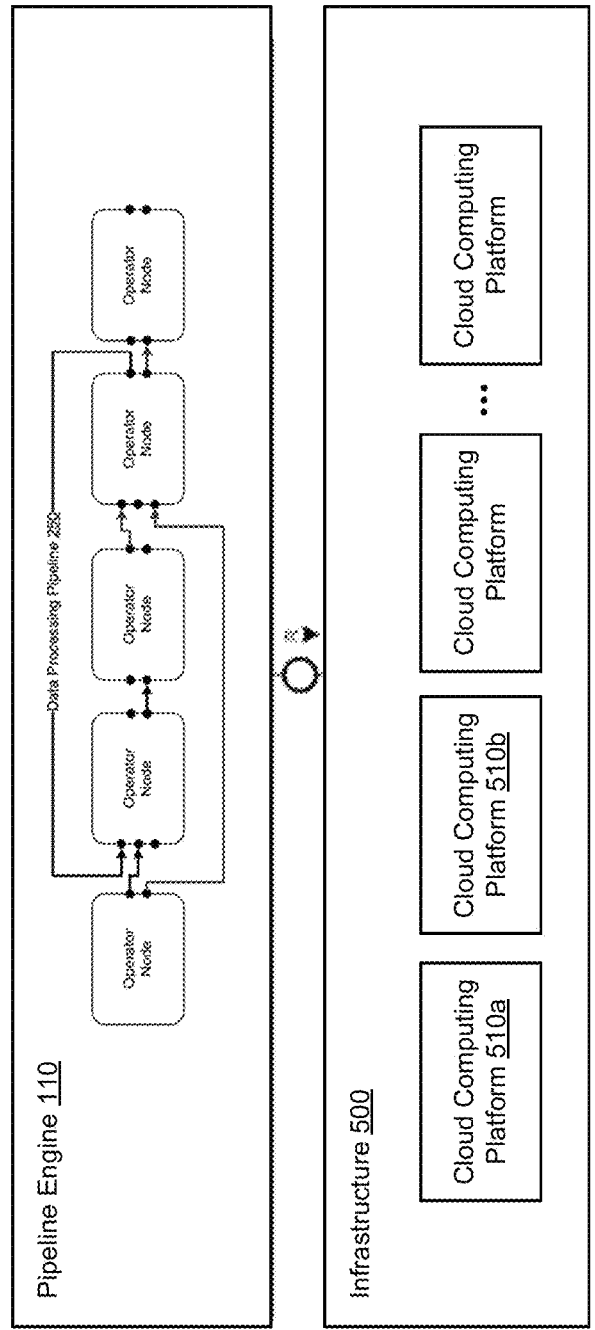
FIG. 5 depicts a schematic diagram illustrating an example of a deployment of a data processing pipeline implementing a machine learning model, in accordance with some example embodiments.

Referring to FIG. 5, the pipeline engine 110 may deploy the data processing pipeline 250 to an infrastructure 500 with one or more cloud computing platforms (e.g., MICROSOFT AZURE, AMAZON AWS, GOOGLE CLOUD, and/or the like) including, for example, a first cloud computing platform 510a, a second cloud computing platform 510b, and/or the like. The first cloud computing platform 510a and the second cloud computing platform 510b may have different timing definitions. For example, factors affecting the runtime of the data processing pipeline 250, including storage capacities, technical restrictions, response times, and/or the like, may vary across the first cloud computing platform 510a and the second computing platform 510b. Even at the same cloud computing platform, these factors may evolve over time due to changes in individual user provisions including, for example, types of storage, data centers, and/or the like. An optimal allocation of the time budget available to the user 125 at the client 120 to execute the data processing pipeline 250 may require an accurate and consistent estimate of the runtime associated with the data processing pipeline 250. However, differences in timing definitions across the first cloud computing platform 510a and the second cloud computing platform 510b may prevent the runtime of the data processing pipeline 250 to be determined with sufficient accuracy and consistency.

Referring again to FIG. 3A, the orchestrator node 230 of the data processing pipeline 250a may include a runtime estimator 320 as well as an optimizer 330 and a budget counter 340. In some example embodiments, the runtime estimator 320 may be configured to determine a runtime estimate for the data processing pipeline 250a executing one or more machine learning trials, each of which including a different type of machine learning model and/or a different set of trial parameters. For example, the runtime estimator 320 may define checkpoints for collecting time information in order to avoid inconsistencies introduced by different timing definitions at different cloud computing platforms including, for example, the first cloud computing platform 510a, the second cloud computing platform 510b, and/or the like. The runtime estimator 320 may generate a runtime estimate for each individual machine learning trial as well as a runtime estimate for a process including the machine learning trials. The runtime estimator 320 may further identify, based at least on the runtime estimate of various machine learning trials, one or more machine learning trials that may be executed without exceeding the available time budget. The optimizer 330 may optimize the execution of the one or more machine learning trials before the orchestrator node 230 triggers, at the executor node 280, the execution of the one or more machine learning trials. The orchestrator node 230 may continue to trigger the execution of successive machine learning trials until the budget counter 340 signals a depletion of the available time budget.

In some example embodiments, the differences in timing definitions across different cloud computing platforms, such as the first cloud computing platform 510a and the second cloud computing platform 510b, may be harmonized by defining one or more checkpoints, each of which corresponding to an event associated with the execution of a machine learning trial. The runtime estimator 320 may determine the runtime of a machine learning trial by at least collecting a timing information associated with the one or more checkpoints and determining a quantity of time elapsed between two or more successive checkpoints. As such, instead of relying on the time statistics provided by the first cloud computing platform 510a and/or the second cloud computing platform 510b, a runtime estimate for the data processing pipeline 250 may be determined based on a first time associated with a first checkpoint corresponding to when an input dataset is received at the preparator node 240 and a second time associated with a second checkpoint corresponding to when the corresponding training dataset and/or validation dataset generated by the preparator node 240 is sent to the executor node 280 to execute a machine learning trial corresponding to the data processing pipeline 250.

Figure 6A:
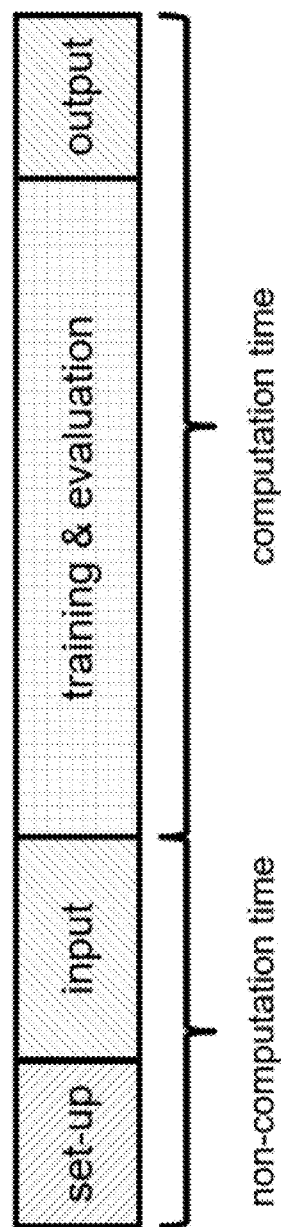
FIG. 6A depicts a schematic diagram illustrating the various components of runtime, in accordance with some example embodiments.

The runtime estimator 320 may collect, as noted, timing information associated with various checkpoints in order to determine a runtime associated with the data processing pipeline 250 including, for example, the runtime of a machine learning trial that is executed by executing the data processing pipeline 250. To further illustrate, FIG. 6A depicts a schematic diagram illustrating the various components of the runtime associated with the data processing pipeline 250, in accordance with some example embodiments. As shown in FIG. 6A, the runtime associated with the data processing pipeline 250 may include a non-computation time and a computation time. The non-computation time may include a set-up time associated with provisioning a computing instance and starting an execution of the machine learning trials, which may correspond to a quantity of time required to deploy and/or start the executor node 280. For example, the set-up time may correspond to a quantity of time elapsed between a first time when a set of trial parameters is sent to the executor node 280 and a second time when the executor node 280 executes a corresponding machine learning trial. The non-computation time may include an input time for transferring the training dataset and/or the validation dataset from a central storage system, for example, the shared persistence 115, to a local computing instance including the experimental persistence 300. The computation time component of the runtime associated with the data processing pipeline 250 may include a training and evaluation time, which may correspond to a quantity of time required to perform the computations associated with a machine learning trial including training a corresponding machine learning model and evaluating its performance. The computation time may also include an output time, which may correspond to a quantity of time required to time to write, to a central storage system such as the shared persistence 115, a result of the machine learning model including the trained machine learning model, the output of the machine learning model, and the corresponding log files.

Figure 6B:
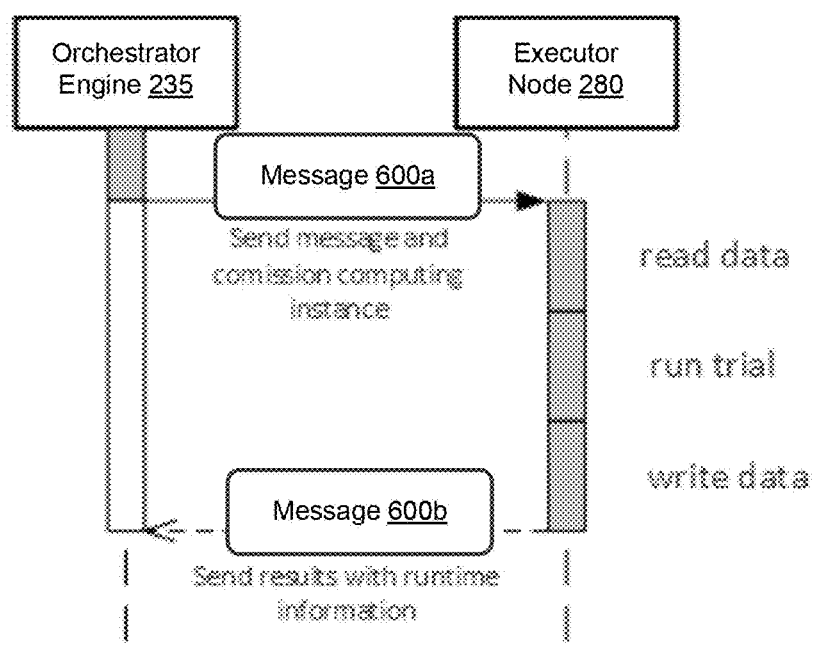
FIG. 6B depicts a sequence diagram illustrating an example of an extended message exchange, in accordance with some example embodiments.

In order for the runtime estimator 320 to collect the timing information associated with the various checkpoints, the messages that are exchanged between the various nodes of the data processing pipeline 250 may be extended to include additional fields to accommodate timing information. For example, FIG. 6B depicts a sequence diagram illustrating an example of an extended message exchange, in accordance with some example embodiments. As shown in FIG. 6B, the orchestrator node 230, for example, an orchestration engine 235 that is communicatively coupled with the runtime estimator 320, may send, to the executor node 280, a first message 600a triggering the execution of a machine learning trial before receiving, from the executor node 280, a second message 600b conveying a result of the machine learning model. The first message 600a and/or the second message 600b may be extended to include timing information associated with the set-up, input, training and evaluation, and output of the machine learning trial to enable a determination of the runtime associated with the machine learning trial.

In some example embodiments, the runtime associated with the data processing pipeline 250 may be determined based on timing information associated with test trials performed at a cloud computing platform, for example, the first cloud computing platform 510a or the second cloud computing platform 510b, using benchmark datasets covering various use cases and data characteristics (e.g., datasets with many rows or many features, difficult classification task or multiple text columns to preprocess, and/or the like). To ensure reproducible results, the test trials may be performed with pre-defined configurations as well as fixed seeds for the random number generators used during the optimization process. The test trials may be performed upon initial deployment to a cloud computing platform, at scheduled intervals, and/or in response to subsequent changes at the cloud computing platform (e.g., upgrades of the computing resources, modifications to storage system, and/or the like).

Alternatively and/or additionally, the runtime associated with the data processing pipeline 250 may be determined based on timing information collected from user trials. The timing information associated with the user trials may be supplemented by the timing information associated with the test trials when there is insufficient timing information associated with user trials. However, to determine the runtime associated with the data processing pipeline 250, the runtime estimator 320 may be configured to prioritize the timing information associated with the user trials and/or more recent timing information. For example, the runtime estimator 320 may assign a lower weight to the timing information associated with the test trials and/or less recent timing information when determining the runtime of the data processing pipeline 250.

In some example embodiments, the runtime estimator 320 may include one or more runtime estimation models trained, based at least on the timing information associated with the test trials and/or the user trials, to determine a runtime for the process including the one or more individual machine learning trials that are executed by executing the data processing pipeline 250. The one or more runtime estimation models may include a computation time model trained to determine the computation time component of the runtime associated with the data processing pipeline 250. Furthermore, the one or more runtime estimation models may include a non-computation time model trained to determine the non-computation time component of the runtime associate with the data processing pipeline 250. Each of the one or more runtime estimation models may be a machine learning model implemented, for example, using the data processing pipeline 250 (or a different data processing pipeline). For example, a linear regression model, a neural network, a mixture model, an isotonic regression model, and/or the like.

Because the set-up time may be constant and the input time may scale linearly with the size of the training dataset and/or the validation dataset, the non-computation time model may be implemented using a linear regression model. By contrast, the computation time model may be implemented using more complex machine learning models that affords better flexibility and/or robustness. For example, the computation time model may be implemented using a mixture model (e.g., a Gaussian mixture model and/or the like) or a neural network capable of providing not only a scalar value but a probability distribution of the runtime. Alternatively and/or additionally, the computation time model may be implemented using an isotonic regression model capable of enforcing certain constraints to ensure, for example, non-negative runtime estimations, monotonicity in the runtime estimation with respect to the size of the dataset, and/or the like.

In some example embodiments, the runtime estimator 320 may be configured to generate a runtime estimate for a process that includes one or more machine learning trials to generate a machine learning model including a set of model parameters and hyper-parameters for performing a task. The runtime estimate for the process may be provided, for example, to the client 120 (e.g., via the user interface 150) such that the user 125 may allocate, based on the runtime estimate of the process, a sufficient time budget for generating an optimal machine learning model for the task associated with the input dataset. The runtime estimates associated with the individual machine learning trials further enable the identification of one or more machine learning trials that may be executed without exceeding the available time budget.

For example, the runtime estimator 320 may determine a runtime estimate for a process to generate a machine learning model to perform a task. The user 125 at the client 120 may be alerted via the user interface 150 if the user 125 failed to allocate a sufficient time budget for the process. The orchestrator node 230 may also avoid executing the data processing pipeline 250 to identify the machine learning model if the runtime required for identifying the machine learning model exceeds the available time budget. Alternatively and/or additionally, the orchestrator node 230 may determine to execute a first machine learning trial but not a second machine learning trial if the runtime of the first machine learning trial does not exceed the available time budget but the runtime of the second machine learning model exceeds the available time budget.

In some example embodiments, the runtime estimator 320 may generate one or more runtime estimates based at least on an input dataset associated with a task including, for example, object identification, natural language processing, information retrieval, speech recognition, classification, regression, and/or the like. For example, upon receiving the input dataset, the orchestrator node 230 may call the preparator node 240 to perform a consistency check on the input dataset as well as to determine the corresponding task metadata including, for example, task type, column types, target column, and/or the like. To maximize efficiency, the preparator node 240 may omit at least some of the preprocessing of the input dataset not necessary for generating the runtime estimates. The orchestrator node 230 may generate, based at least on the task metadata determined by the preparator node 240, a hyper-parameter space for the task. The task metadata data as well as the hyper-parameter space of the task may be forwarded to the runtime estimator 320 to determine a runtime estimate for the individual machine learning trials as well as a runtime estimate for the process including the one or more machine learning models.

To determine a reliable runtime estimate for the input dataset and the corresponding task, the computation time model may be marginalized over various possible trial parameter sets. That is, the runtime estimate for the input dataset and the corresponding task may be generated to account for possible variations in the trial parameter set. The marginalization of the computation time model may be represented using a numerical approximation. For example, the computation time model may be used to determine a computation time for a sampling of trial parameter sets following a uniform distribution or an empirical distribution of trial parameter sets from one or more previous machine learning trials. This sampling may provide a distribution of computation times for computing an average computation time over a variety of trial parameter sets. Alternatively and/or additionally, other information, such as percentiles, may be extracted from the distribution of computation times to calculate more complex budget estimations. For instance, the computation time may be determined by calculating a numerical convolution and/or an analytical convolution of the distribution of computation times and extracting the average (or different value) from this final distribution to yield a more accurate estimate in case of non-Gaussian distribution. Unlike the computation component of runtime, the non-computation component of runtime may be independent from the trial parameter set and may be calculated once using the non-computation time model based on the size of the input dataset.

In some example embodiments, the runtime estimator 320 may determine a runtime estimate for one or more individual machine learning trials. Alternatively and/or additionally, the runtime estimator 320 may determine a runtime estimate for a process including the one or more machine learning trials to generate a machine learning model for performing a task including a set of model parameters and hyper-parameters for performing the task associated with the input dataset. As noted, the orchestrator node 230 may avoid executing the data processing pipeline 250 if the runtime estimate for identifying the machine learning model exceeds the available time budget. Moreover, the user interface 150 may be updated to display one or more time budget recommendations including, for example, a recommended time budget for completing the process, a warning when the user 125 fails to allocate a sufficient time budget, and/or the like.

The runtime estimate for a process in which one or more machine learning trials are executed to generate a machine learning model may correspond to a sum of the average computation time and the estimated non-computation time multiplied with a multiplier corresponding to an expected quantity of machine learning trials to generate the machine learning model and divided by a parallelization factor corresponding to a quantity of concurrently executing machine learning trials (e.g., on multiple executor nodes 280). For example, if the average computation time is 25 seconds, the non-computation time is 5 seconds, and 50 machine learning trials are necessary to generate a machine learning model, the runtime estimate without parallelization may be 25 minutes. If five machine learning trials may be executed in parallel, then a wall-clock based runtime estimate may be 5 minutes.

In some example embodiments, the expected quantity of machine learning trials required to generate a machine learning model (including a set of model parameters and hyper-parameters for performing the task associated with the input dataset) may be determined based on the benchmark datasets covering various use cases and data characteristics (e.g., datasets with many rows or many features, difficult classification task or multiple text columns to preprocess, and/or the like). For example, for each benchmark dataset, an $i^{th}$ machine learning trial may yield an optimal performance such that the machine learning model is identified by the $i^{th}$ machine learning trial. The multiplier may be extracted from a distribution of various values of i associated with the benchmark datasets. For example, the multiplier may be the $75^{th}$ percentile (or another percentile) of the distribution, a median of the distribution, an average of the distribution, and/or the like. The value of the multiplier may be selected to ensure that the runtime estimate includes sufficient time for generating a machine learning model. It should be appreciated that using the index of the machine learning trial instead of an accumulated runtime may eliminate skews associated with the size of the input dataset, the complexity of the corresponding task, and/or the like.

Executing the data processing pipeline 250 may include executing one or more machine learning trials, each of which including a different type of machine learning model and/or a different set of trial parameters. A machine learning model for performing a task, including a set of model parameters and hyper-parameters, may be identified based on the machine learning trial having a best performance. Nevertheless, without an accurate or consistent runtime estimate for each machine learning trial, the user 125 may allocate an insufficient time budget and/or the available time budget may not be used efficiently such that the process or individual machine learning trials may exceed the available time budget or an excessive quantity of allocated time budget remains unused.

In some example embodiments, the runtime estimate for a process and/or the runtime estimate for each of the machine learning trials included in the process may be provided, for example, as a recommendation displayed via the user interface 150 at the client 120 such that the user 125 may allocate a sufficient time budget. Moreover, the orchestrator node 230 may therefore identify, based at least on the runtime of various machine learning trials, one or more machine learning trials that may be executed without exceeding the available time budget. In doing so, the orchestrator node 230 may prevent executing one or more machine learning trials whose runtime estimate exceeds the available time budget. For example, the orchestrator node 230 may identify, as a next machine learning trial for execution by the executor node 280, a machine learning trial whose runtime does not exceed the available time budget. However, it should be appreciated that the runtime estimate of the machine learning trials may be associated with some degree uncertainty including a certain probability of exceeding the available time budget.

Figure 7A:
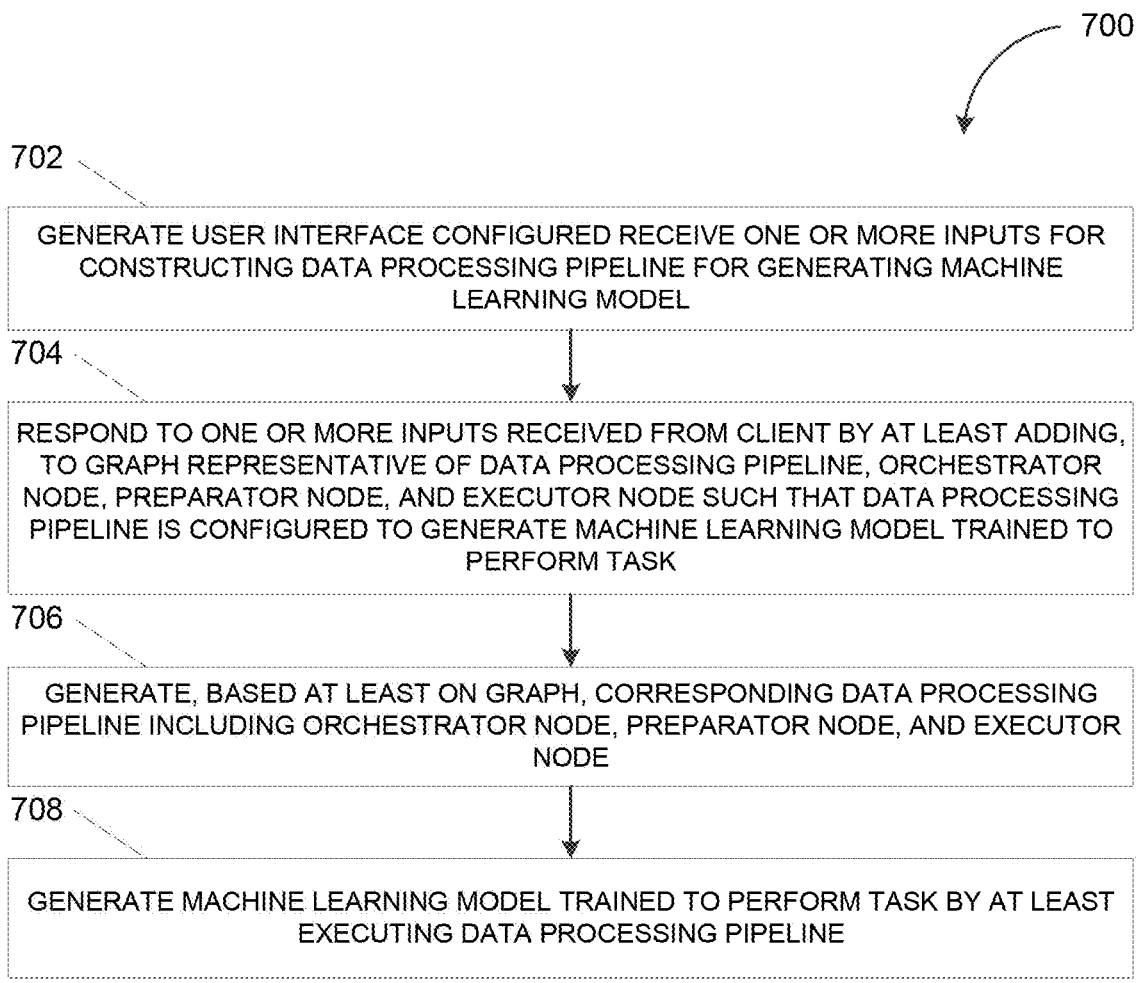
FIG. 7A depicts a flowchart illustrating a process for generating a data processing pipeline configured to generate a machine learning model, in accordance with some example embodiments.

FIG. 7A depicts a flowchart illustrating a process 700 for generating a data processing pipeline configured to generate a machine learning model, in accordance with some example embodiments. Referring to FIGS. 1, 2A-C, 3A-C, 4-5, 6A-B, and 7A-B, the process 700 may be performed by the pipeline engine 110 in order to generate, for example, the data processing pipeline 250 configured to generate a machine learning model. The machine learning model generated by the data processing pipeline may be a machine learning model having a set of parameters and/or hyperparameters for performing a cognitive task such as, for example, object identification, natural language processing, information retrieval, speech recognition, classification, and/or regression.

At 702, the pipeline engine 110 may generate a user interface configured to receive one or more inputs for constructing of a data processing pipeline for generating a machine learning model. For example, the pipeline engine 110 may generate the user interface 150 which may be configured to display, at the client 120, a selection of operator nodes including, for example, the orchestrator node 230, the preparator node 240, and the executor node 280. The selection of operator nodes displayed, at the client 120, as part of the user interface 150 may also include one or more auxiliary operator nodes including, for example, the start node 260, the user interface node 270, and/or the like. As part of a data processing pipeline, the start node 260 may be configured to receive inputs configuring a process including one or more machine learning trials while the user interface node 270 may be configured to output the progress and/or the result of the one or more machine learning trials. Alternatively, instead of displaying a selection of operator nodes, the user interface 150 may display one or more dialog boxes prompting the user 125 to select one or more operator nodes to include in a data processing pipeline.

At 704, the pipeline engine 110 may respond to one or more inputs received from the client 120 by at least adding, to a graph representative of a data processing pipeline, the orchestrator node, the preparator node, and the executor node such that the data processing pipeline is configured to generate a machine learning model trained to perform a task. For example, the pipeline engine 110 may generate a graph representative of the data processing pipeline 250 configured to generate a machine learning model. In the example shown in FIG. 2B, the data processing pipeline 250 may be constructed to include the orchestrator node 230, the preparator node 240, and the executor node 280. Furthermore, as shown in FIG. 2B, the data processing pipeline 250 may be constructed to include the start node 260 and the user interface node 270. As noted, the data processing pipeline 250 may be executed to generate a machine learning model for performing a task associated with an input dataset. As part of the data processing pipeline 250, the start node 260 may be configured to receive inputs configuring the process to generate the machine learning model while the progress and the result of the process may be output by the user interface node 270.

The orchestrator node 230, the preparator node 240, the start node 260, the user interface node 270, and the executor node 280 may be interconnected by one or more directed edges indicating a flow of data between the orchestrator node 230, the preparator node 240, the start node 260, the user interface node 270, and the executor node 280. For instance, the orchestrator node 230 and the preparator node 240 may be interconnected by a first directed edge indicating that an output of the orchestrator node 230 may be provided as an input to the preparator node 240 as well as a second directed edge indicating that an output of the preparator node 240 may be provided as an input to the orchestrator node 230. Alternatively and/or additionally, the orchestrator node 230 and the executor node 280 may be interconnected by a third directed edge indicating that an output of the orchestrator node 230 may be provided as an input to the executor node 280 as well as a fourth directed edge indicating that an output of the executor node 280 may be provided as an input to the orchestrator node 230.

At 706, the pipeline engine 110 may generate, based at least on the graph, the corresponding data processing pipeline including the orchestrator node, the preparator node, and the executor node. For instance, in some example embodiments, the pipeline engine 110 may generate, based at least on the corresponding graph, the data processing pipeline 250 including the orchestrator node 230, the preparator node 240, the start node 260, the user interface node 270, and the executor node 280

At 708, the pipeline engine 110 may generate a machine learning model trained to perform the task by at least executing the data processing pipeline. For example, the pipeline engine 110 may generate a machine learning model trained to perform a task by at least executing the data processing pipeline 250 including the orchestrator node 230, the preparator node 240, the executor node 280, the start node 260, and the user interface node 270. Executing the data processing pipeline 250 may include performing the one or more data processing operations associated with each of the orchestrator node 230, the preparator node 240, the executor node 280, the start node 260, and the user interface node 270.

In some example embodiments, the orchestrator node 230 may be executed to at least coordinate the operations of the preparator node 240 and the executor node 280. For example, the orchestrator node 230 may respond to receiving, from the start node 260, the initial configurations for implementing the machine learning model by at least triggering, at the preparator node 240, the generation of the training dataset and the validation dataset. Upon receiving, from the preparator node 240, an indication that the preparator node 240 has generated the training dataset and the validation dataset, the orchestrator node 230 may trigger, at the executor node 280, the execution of one or more machine learning trials, each of which applying a different type of machine learning model and/or a different set of trial parameters to the training dataset and/or the validation dataset generated by the preparator node 240. Moreover, the orchestrator node 230 may be executed to at least determine, based at least on the results of the machine learning trials executed by the executor node 280, a machine learning model including the set of model parameters and hyperparameters for performing a specified task.

Figure 7B:
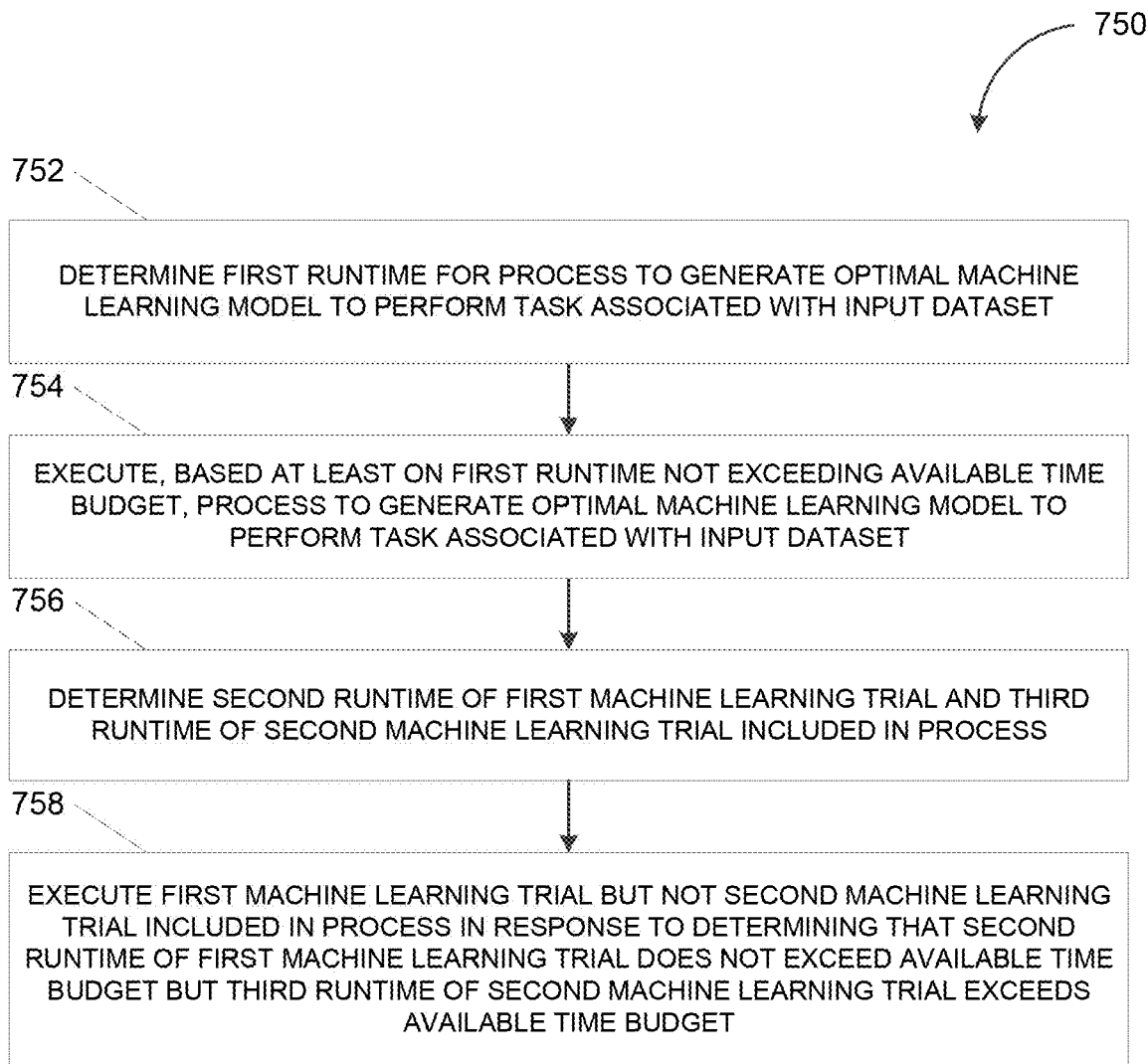
FIG. 7B depicts a flowchart illustrating an example of a process for estimating a runtime of a machine learning data processing pipeline, in accordance with some example embodiments.

FIG. 7B depicts a flowchart illustrating an example of a process 750 for allocating a time budget for executing a machine learning data processing pipeline, in accordance with some example embodiments. Referring to FIGS. 1, 2A-C, 3A-C, 4-5, 6A-B, and 7A-B, the process 750 may be performed by the orchestrator node 230 including, for example, the runtime estimator 320, as part of operation 708 of the process 700.

At 752, the orchestrator node 230 may determine a first runtime for a process to generate a machine learning model for performing a task associated with an input dataset. In some example embodiments, the runtime estimator 320 may determine a runtime estimate for a process in which one or more machine learning trials are executed to identify the machine learning model for performing the task. The runtime estimate for the process may correspond to a sum of the average computation time and the estimated non-computation time multiplied with a multiplier corresponding to an expected quantity of machine learning trials to identify the machine learning model and divided by a parallelization factor corresponding to a quantity of concurrently executing machine learning trials (e.g., on multiple executor nodes 280). The quantity of machine learning trials required to identify the machine learning model may be determined based on the benchmark datasets covering various use cases and data characteristics such as datasets with many rows or many features, difficult classification task or multiple text columns to preprocess, and/or the like.

In some example embodiments, the runtime estimate for the process may include a non-computation time (e.g., set-up time and input time) and a computation time (e.g., training and evaluation time as well as output time). The runtime estimator 320 may apply a non-computation time model (e.g., a linear regression model) to determine the non-computation time for a machine learning trial and a computation time model (e.g., a complex machine learning model) to determine the computation time for the machine learning trial. Moreover, the average computation time and the estimated non-computation time may be determined based on timing information collected from test trials (e.g., performed using benchmark datasets) and/or actual user trials. The test trials may be performed upon initial deployment to a cloud computing platform, at scheduled intervals, and/or in response to subsequent changes at the cloud computing platform (e.g., upgrades of the computing resources, modifications to storage system, and/or the like). Timing information associated with the user trials may be supplemented by the timing information associated with the test trials when there is insufficient timing information associated with user trials. Nevertheless, as noted, timing information associated with user trials may be supplant and/or replace the timing information associated with the test trials as more user trials are performed to provide adequate timing information.

At 754, the orchestrator node 230 may execute, based at least on the first runtime not exceeding an available time budget, the process to identify the machine learning model to perform the task associated with the input dataset. For example, the orchestrator node 230 may decline to execute a process whose runtime estimate exceeds the available time budget. Alternatively and/or additionally, the orchestrator node 230 may provide, via the user interface 150 at the client 120, the runtime estimate for the process to enable the user 125 to allocate a sufficient time budget for the process.

At 756, the orchestrator node 230 may determine a second runtime of a first machine learning trial and a third runtime of a second machine learning trial included in the process. In some example embodiments, the runtime estimator 320 may determine a runtime estimate for the individual machine learning trials in a process. The runtime estimate for an individual machine learning trial may be determined based at least on the corresponding trial parameter sets. As noted, a process to generate a machine learning model may start with a random set of trial parameters but subsequent trial parameter sets may be generated by incorporating the results of earlier machine learning trials. For instance, an information-based optimization technique (e.g., Bayesian optimization and/or the like) may be applied to identify regions in the hyper-parameter space that are most likely to include the set of model parameters and hyper-parameters. As such, with each successive update, the sampling of the hyper-parameter space may shift from a uniform sampling to an information-weighted sampling using Bayesian (or other) methods.

At 758, the orchestrator node 230 may execute the first machine learning trial but not the second machine learning trial in response to determining that the second runtime of the first machine learning trial does not exceed the available time budget but the third runtime of the second machine learning trial exceeds the available time budget. In some example embodiments, the runtime estimator 320, may be configured to maximize the usage of the available time budget including by selecting, for execution by the executor node 280, one machine learning trials whose runtime estimate does not exceed the available time budget. For example, given an n quantity of trial parameter sets (e.g., sampled from a uniform distribution and/or generated by an information-based optimizer), the orchestrator node 230 may eliminate one or more trial parameter sets whose runtime exceeds the available time budget. Accordingly, the orchestrator node 230 may determine to execute the first machine learning trial if the computation time associated with the first machine learning trial does not exceed the remaining time budget adjusted for the non-computation time associated with the process. Contrastingly, the orchestrator node 230 may avoid executing a second machine learning trial if the computation time associated with the second machine learning trial exceeds the available time budget.

Figure 8:
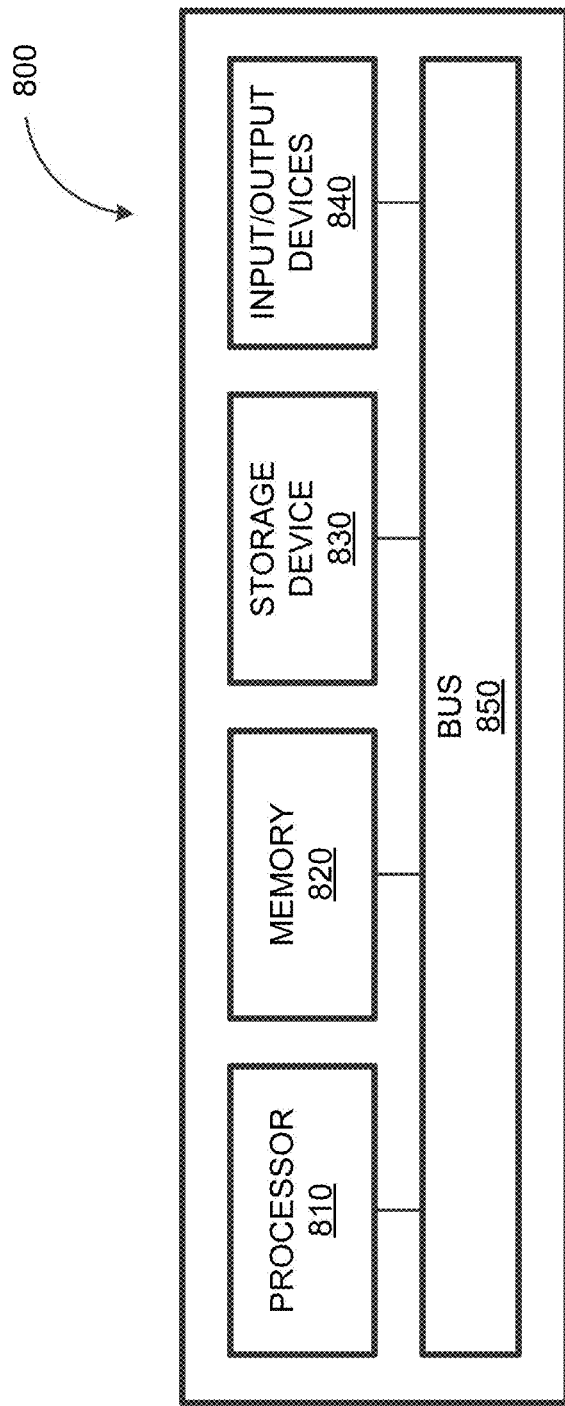
FIG. 8 depicts a block diagram illustrating a computing system, in accordance with some example embodiments.

FIG. 8 depicts a block diagram illustrating a computing system 800 consistent with implementations of the current subject matter. Referring to FIGS. 1, 2A-C, 3A-C, 4-5, 6A-B, 7A-B, and 8, the computing system 800 can be used to implement the pipeline engine 110 and/or any components therein.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of, for example, the pipeline engine 110. In some example embodiments, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a solid state drive, a floppy disk device, a hard disk device, an optical disk device, or a tape device, or other suitable persistent storage means. The input/output device 840 provides input/output operations for the computing system 800. In some example embodiments, the input/output device 840 includes a keyboard and/or pointing device. In various implementations, the input/output device 840 includes a display unit for displaying graphical user interfaces.

According to some example embodiments, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some example embodiments, the computing system 800 can be used to execute various interactive computer software applications that can be used for organization, analysis and/or storage of data in various formats. Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, from a client device, one or more inputs for constructing a data processing pipeline configured to implement a process to generate a machine learning model for performing a task associated with an input dataset, the process comprising a plurality of machine learning trials, each of the plurality of machine learning trials applying, to a training dataset, a respective type of machine learning model and a respective set of trial parameters, the machine learning model being generated based at least on a result of the plurality of machine learning trials;
   deploying, to a first cloud computing platform and to a second cloud computing platform, the data processing pipeline;
   defining, for each of the first cloud computing platform and the second cloud computing platform, two or more successive checkpoints in order to avoid inconsistencies introduced by different timing definitions at the first cloud computing platform and the second cloud computing platform, each checkpoint of the two or more successive checkpoints corresponding to an event associated with executing a machine learning trial;
   collecting, from the first cloud computing platform first timing information associated with the two or more successive checkpoints;
   collecting, from the second cloud computing platform, second timing information associated with the two or more successive checkpoints;
   computing a computation time which is computed by applying a computation time model configured to provide a probability distribution of runtime across different trial parameter sets, wherein each different trial parameter set comprises different initial weights applied by the machine learning model prior to training;
   determining, based at least on the first timing information and the computation time, a first runtime for the process to generate the machine learning model on the first cloud computing platform, wherein the first runtime comprises a non-computation time associated with provisioning a computing instance and starting an execution of the plurality of machine learning trials, and wherein the non-computation time is determined by at least applying a linear regression model configured to determine, based at least on a size of the training dataset and/or a validation dataset, the non-computation time, and wherein the first runtime is determined based at least on an expected quantity of machine learning trials required to generate the machine learning model;
   determining, based at least on the second timing information and the computation time, a second runtime for the process to generate the machine learning model on the second cloud computing platform; and
   executing, based at least on the first runtime not exceeding an available time budget and the second runtime exceeding the available time budget, the process to generate the machine learning model on the first cloud computing platform.

2. The system of claim 1, wherein the computation time model comprises the machine learning model generated by executing the data processing pipeline, a mixture model, a neural network, an isotonic regression model, an instance-based model, a regularization model, a decision tree, a random forest, a Bayesian model, a clustering model, an associative model, a dimensionality reduction model, and/or an ensemble model.

3. The system of claim 1, wherein the computation time model is trained based at least on timing information collected from one or more test trials and one or more user trials, wherein the one or more test trials are performed in response to changes at the first cloud computing platform or the second cloud computing platform.

4. The system of claim 3, wherein the training of the computation time model prioritizes more recent timing information and/or timing information from the one or more user trials.

5. The system of claim 1, wherein the expected quantity of machine learning trials is determined by a quantity of machine learning trials executed to generate a machine learning model for one or more benchmark datasets, and wherein the one or more benchmark datasets cover different use cases and input datasets having different characteristics.

6. The system of claim 1, wherein the first runtime is generated based at least on a quantity of a plurality of machine learning models being executed in parallel.

7. The system of claim 1, further comprising:
   updating a user interface at the client device to display the first runtime; and
   receiving, from the client device, an indication to allocate a time budget corresponding to the first runtime.

8. The system of claim 1, further comprising:
   determining a third runtime for a first machine learning trial included in the plurality of machine learning trials, the third runtime being determined based at least on a first trial parameter set associated with the first machine learning trial;
   determining a fourth runtime for a second machine learning trial included in the plurality of machine learning trials, the fourth runtime being determined based at least on a second trial parameter set associated with the second machine learning trial; and
   executing, based at least on the third runtime not exceeding the available time budget and the fourth runtime exceeding the available time budget, the first machine learning trial but not the second machine learning trial.

9. The system of claim 8, wherein the first trial parameter set and the second trial parameter set are generated by sampling from a uniform distribution and/or applying an information-based optimization technique.

10. The system of claim 8, wherein the executing of the first machine learning trial comprises applying, to the training dataset and a validation dataset, a first machine learning model having a first set of trial parameters.

11. The system of claim 10, further comprising:
    executing a third machine learning trial by at least applying, to the training dataset and the validation dataset, the first machine learning model having a second set of trial parameters, a second machine learning model having the first set of trial parameters, or the second machine learning model having a third set of trial parameters.

12. The system of claim 1, wherein the data processing pipeline comprises an orchestrator node, a preparator node, and an executor node, wherein the preparator node is configured to generate, based at least on the input dataset, a training dataset for training a machine learning model to perform the task and a validation dataset for evaluating a performance of the machine learning model trained to perform the task, wherein the executor node is configured to execute the plurality of machine learning trials, and wherein the orchestrator node is configured to identify, based at least on the result of the plurality of machine learning trials, the machine learning model for performing the task associated with the input dataset.

13. The system of claim 12, wherein the machine learning model for performing the task is generated by at least executing, based on a corresponding graphical representation of the data processing pipeline, the data processing pipeline comprising the orchestrator node, the preparator node, and the executor node.

14. The system of claim 1, wherein the machine learning model comprises a neural network, a regression model, an instance-based model, a regularization model, a decision tree, a random forest, a Bayesian model, a clustering model, an associative model, a dimensionality reduction model, and/or an ensemble model.

15. A computer-implemented method, comprising:
    receiving, from a client device, one or more inputs for constructing a data processing pipeline configured to implement a process to generate a machine learning model for performing a task associated with an input dataset, the process comprising a plurality of machine learning trials, each of the plurality of machine learning trials applying, to a training dataset, a respective type of machine learning model and a respective set of trial parameters, the machine learning model being generated based at least on a result of the plurality of machine learning trials;
    deploying, to a first cloud computing platform and to a second cloud computing platform, the data processing pipeline;
    defining, for each of the first cloud computing platform and the second cloud computing platform, two or more successive checkpoints in order to avoid inconsistencies introduced by different timing definitions at the first cloud computing platform and the second cloud computing platform, each checkpoint of the two or more successive checkpoints corresponding to an event associated with executing a machine learning trial;
    collecting, from each of the first cloud computing platform first timing information associated with the two or more successive checkpoints;
    collecting, from the second cloud computing platform, second timing information associated with the two or more successive checkpoints;
    computing a computation time computed by applying a computation time model configured to provide a probability distribution of runtime across different trial parameter sets, wherein each different trial parameter set comprises different initial weights applied by the machine learning model prior to training;
    determining, based at least on the first timing information and the computation time, a first runtime for the process to generate the machine learning model on the first cloud computing platform, wherein the first runtime comprises a non-computation time associated with provisioning a computing instance and starting an execution of the plurality of machine learning trials, and wherein the non-computation time is determined by at least applying a linear regression model configured to determine, based at least on a size of the training dataset and/or a validation dataset, the non-computation time, and wherein the first runtime is determined based at least on an expected quantity of machine learning trials required to generate the machine learning model;
    determining, based at least on the second timing information and the computation time, a second runtime for the process to generate the machine learning model on the second cloud computing platform; and
    executing, based at least on the first runtime not exceeding an available time budget and the second runtime exceeding the available time budget, the process to generate the machine learning model on the first cloud computing platform.

16. A non-transitory computer readable medium storing instructions, which when executed by at least one data processor, result in operations comprising:
    receiving, from a client device, one or more inputs for constructing a data processing pipeline configured to implement a process to generate a machine learning model for performing a task associated with an input dataset, the process comprising a plurality of machine learning trials, each of the plurality of machine learning trials applying, to a training dataset, a respective type of machine learning model and a respective set of trial parameters, the machine learning model being generated based at least on a result of the plurality of machine learning trials;
    deploying, to a first cloud computing platform and to a second cloud computing platform, the data processing pipeline;
    defining, for each of the first cloud computing platform and the second cloud computing platform, two or more successive checkpoints in order to avoid inconsistencies introduced by different timing definitions at the first cloud computing platform and the second cloud computing platform, each checkpoint of the two or more successive checkpoints corresponding to an event associated with executing a machine learning trial;
    collecting, from the first cloud computing platform first timing information associated with the two or more successive checkpoints;
    collecting, from the second cloud computing platform, second timing information associated with the two or more successive checkpoints;
    computing a computation time computed by applying a computation time model configured to provide a probability distribution of runtime across different trial parameter sets, wherein each different trial parameter set comprises different initial weights applied by the machine learning model prior to training;
    determining, based at least on the first timing information and the computation time, a first runtime for the process to generate the machine learning model on the first cloud computing platform, wherein the first runtime comprises a non-computation time associated with provisioning a computing instance and starting an execution of the plurality of machine learning trials, and wherein the non-computation time is determined by at least applying a linear regression model configured to determine, based at least on a size of the training dataset and/or a validation dataset, the non-computation time, and wherein the first runtime is determined based at least on an expected quantity of machine learning trials required to generate the machine learning model;
    determining, based at least on the second timing information and the computation time, a second runtime for the process to generate the machine learning model on the second cloud computing platform; and executing, based at least on the first runtime not exceeding an available time budget and the second runtime exceeding the available time budget, the process to generate the machine learning model on the first cloud computing platform.

\* \* \* \* \*